US012752191B2

(12) United States Patent
Wang et al.

(10) Patent No.: US 12,752,191 B2
(45) Date of Patent: Oct. 6, 2026

(54) AUTOMATED LAYOUT DESIGN FOR BUILDING GAME WORLDS

(71) Applicant: Autodesk, Inc., San Francisco, CA (US)

(72) Inventors: Yi Wang, Richmond, CA (US); Adam Gaier, Bonn (DE); Dale Zhao, New York, NY (US); Hilmar Alexander Koch, San Francisco, CA (US); Jieliang Luo, San Bruno, CA (US); Christopher Michael Wade, Birmingham (GB); Evan Atherton, Castro Valley, CA (US)

(73) Assignee: AUTODESK, INC., San Francisco, CA (US)

( * ) Notice: Subject to any disclaimer, the term of this patent is extended or adjusted under 35 U.S.C. 154(b) by 183 days.

(21) Appl. No.: 18/882,607

(22) Filed: Sep. 11, 2024

(65) Prior Publication Data

US 2025/0083049 A1 Mar. 13, 2025

Related U.S. Application Data

(60) Provisional application No. 63/581,903, filed on Sep. 11, 2023.

(51) Int. Cl.
*A63F 13/60* (2014.01)
*G06F 40/20* (2020.01)
(Continued)

(52) U.S. Cl.
CPC .............. *A63F 13/60* (2014.09); *G06F 40/20* (2020.01); *G06T 17/05* (2013.01); *G06T 17/20* (2013.01); *A63F 2300/6009* (2013.01)

(58) Field of Classification Search
CPC .. A63F 13/358; A63F 13/40; A63F 13/44–52; A63F 13/525; A63F 13/537;
(Continued)

(56) References Cited

U.S. PATENT DOCUMENTS

2018/0296925 A1* 10/2018 Yuan ..................... A63F 13/215
2019/0151758 A1* 5/2019 Anglin .............. G06F 16/90344
(Continued)

OTHER PUBLICATIONS

Hartsook, K., et al., "Toward Supporting Stories with Procedurally Generated Game Worlds", 2011 IEEE Conference on Computational Intelligence and Games (CIG'11), pp. 1-8.
(Continued)

*Primary Examiner* — Omkar A Deodhar
(74) *Attorney, Agent, or Firm* — Gates & Cooper LLP

(57) ABSTRACT

A method and system provide the ability to build a game world. A story is obtained that provides a textual narrative of a sequence of events. Plot facilities and a set of constraints are extracted from the story. Each of the plot facilities is a conceptual location where an event happens in the story. Each constraint defines a spatial relation between plot facilities. A map is generated based on the set of constraints by: generating a terrain of two dimensional (2D) polygons that is each associated with a biome type, and assigning each plot facility to a point on the terrain. The assigning complies with a maximum number of constraints and utilizes reinforcement learning (RL) to optimize positions of the points.

20 Claims, 11 Drawing Sheets

(51) Int. Cl.
*G06T 17/05* (2011.01)
*G06T 17/20* (2006.01)

(58) Field of Classification Search
CPC .......... A63F 13/60; A63F 13/70; A63F 13/79; A63F 13/67; A63F 2300/208; A63F 2300/535; A63F 2300/537; A63F 2300/5526; A63F 2300/5533; A63F 2300/554; A63F 2300/5546; A63F 2300/556; A63F 2300/5593; A63F 2300/61–65; A63F 2300/6009; G06F 40/20; G06T 17/05; G06T 17/20
See application file for complete search history.

(56) References Cited

U.S. PATENT DOCUMENTS

| | | | | |
|---|---|---|---|---|
| 2020/0129862 | A1* | 4/2020 | Liu | G06T 17/10 |
| 2021/0178267 | A1* | 6/2021 | St-Pierre | G06T 17/00 |
| 2023/0173395 | A1* | 6/2023 | Cella | G06N 3/0455 463/25 |
| 2023/0419304 | A1* | 12/2023 | Cella | G06N 5/02 |
| 2024/0424405 | A1* | 12/2024 | Rao | A63F 13/47 |
| 2025/0083049 | A1* | 3/2025 | Wang | G06T 17/20 |

OTHER PUBLICATIONS

Valls-Vargas, J., et al., "Towards Story-Based Content Generation: From Plot-Points to Maps", 2013 IEEE Conference on Computational Inteligence in Games (CIG), pp. 1-8.

Dormans, J., et al., "Generating missions and spaces for adaptable play experiences", IEEE Transactions on Computational Intelligence and AI in Games, Sep. 2011, pp. 216-228, vol. 3, No. 3.

* cited by examiner

AUTOMATED LAYOUT DESIGN FOR BUILDING GAME WORLDS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. Provisional Application Ser. No. 63/581,903, filed on Sep. 11, 2023, with inventor(s) Yi Wang, Adam Gaier, Dale Zhao, Hilmar Alexander Koch, Jieliang Luo, Christopher Michael Wade, and Evan Atherton, entitled "Automated Layout Design for Building Game Worlds".

BACKGROUND OF THE INVENTION

1. Field of the Invention

The present invention relates generally to game world building, and in particular, to a method, system, apparatus, and article of manufacture for utilizing reinforcement learning (RL) to automatically assign concrete locations on a game map to abstract locations in a given story.

2. Description of the Related Art (Note: This application references a number of different publications as indicated throughout the specification by names and years enclosed in brackets, e.g., [Name XYXY]. A list of these different publications ordered according to these reference names and years can be found below in the section entitled "References." Each of these publications is incorporated by reference herein.)

Landscapes in video games serve as more than just scenic backdrops; they interact intimately with the unfolding narrative, defining and shaping the player's experience. This interaction is pivotal, underpinning the player's journey. By giving game designers tools for better supporting narratives with game map design, they can create games that are more cohesive and immersive for the player.

Designing game maps is difficult, as it requires designers to consider varied qualities such as realistic topography [Kelly and McCabe 2017; Smelik et al. 2009] and game playability [van der Linden et al. 2014] at the same time. Designing a map that supports a given story adds more constraints, making the problem even more challenging.

While the need to support an underlying story is typically neglected in most existing map generation methods, some efforts have been made to develop the story first, then to codify it as plot points and graphs so that maps can be generated based on their relations [Hartsook et al. 2011; Valls-Vargas et al. 2013]. However, as [Dormans and Bakkes 2011] pointed out, the principles that govern the design of the spatial and the narrative side of the game are different, and thus these two processes should be independent. Methods for generating game maps from stories can appear artificially contrived to fit a narrative, and it is not straightforward to combine these methods with those that also take into account game design and geographical considerations.

As a result, designing a gameworld that facilitates a story requires extensive manual modification; and as the number of constraints scale, the challenge of designing a map that satisfies all of the constraints of the story can become intractable, if not impossible, for a designer to do by hand [Matsumoto 2022]. To better understand the problems of the prior art, a description of prior art story and game map generation, procedural content generation, and RL in modern video games may be useful.

Story and Game Map Generation

Though intertwined, the generation of stories and maps are typically investigated in isolation. A few notable exceptions do tackle them as a single system. [Hartsook et al. 2011] proposed a story-driven procedural map generation method where each event in the plot is associated with a location of a certain environment (e.g., castle, forest, etc.) and a linear plot line is translated to a constraint of a sequential occurrence of locations with corresponding environment type. Map generation is formulated as an optimization problem finding a topological structure of the map balancing requirements from a realistic game world and player preferences, subject to plot constraints. [Valls-Vargas et al. 2013] presents a procedural method that generates a story and a map facilitating the story at the same time. The problem is again formulated as an optimization problem to find a topological structure of the map, but based on various metrics not only from map playability perspective but also the space of possible stories supported by the spatial structure, subject to the input plot points.

Both [Hartsook et al. 2011] and [Valls-Vargas et al. 2013] generate rectangular grid-based maps consisting of discrete "scenes" connected by "passages". The map structure is widely used in many classic games such as Rogue (1980) and early Zelda series (1986). However, many modern RPG games feature seamless world maps with continuous terrains and very few geographical barriers for an immersive open world experience, such as Elden Ring (2022), Pokemon Legend: Arceus (2022) and The Legend of Zelda: Breath of the Wild (2017). [Dormans and Bakkes 2011] use generative grammar based methods for both story (mission) generation and map (space) generation. The story elements are then mapped to spatial elements using heuristics specific to game genre.

Embodiments of the invention also establishes a mapping between narrative and spatial elements. However, embodiments of the invention adopt a more general constraint satisfaction process.

Procedural Content Generation

Procedural Content Generation (PCG) has become an essential component in video games, employed for the algorithmic creation of game elements such as levels, quests, and characters. The primary objectives of PCG are to enhance the replayability of games, reduce the burden on authors, minimize storage requirements, and achieve specific aesthetics [Hendrikx et al. 2013], [Smelik et al. 2009], [Kelly and McCabe 2017], [van der Linden et al. 2014]. Game developers and researchers alike utilize methods from machine learning, optimization, and constraint-solving to address PCG problems [Togelius et al. 2011]. The primary aim of this work is to train RL agents capable of generalizing across a wide range of environments and constraints. To achieve this goal, embodiments of the invention employ a PCG approach to generate a diverse set of maps and constraints to train and test RL agents.

RL in Modern Video Games

The popularity of games in AI (artificial intelligence) research is largely attributed to their usefulness in the development and benchmarking of reinforcement learning (RL) algorithms [Bellemare et al. 2013; Berner et al. 2019; Jaderberg et al. 2019; Vinyals et al. 2019]. However, overfitting remains a pervasive issue in this domain, as algorithms tend to learn specific policies rather than general ones [Zhang et al. 2018]. To counteract overfitting and facilitate policy transfer between different environments, researchers have turned to PCG techniques [Baker et al. 2019; Risi and Togelius 2020; Team et al. 2021].

On the other hand, RL can also be used as a design tool for modern games, especially for accessing and testing games. [Iskander et al. 2020] develops an RL system to play in an online multiplayer game alongside human players. The historical actions from the RL agent can contribute valuable insights into game balance, such as highlighting infrequently utilized combination actions within the game's mechanics. [Bergdahl et al. 2020] uses RL as an augmenting automated tool to test game exploits and logical bugs. [Chen et al. 2023] releases a multi-agent RL environment to study collective intelligence within the context of real-time strategy game dynamics. To the best of our knowledge, embodiments of the invention provide the first instance that uses a learning-based approach to accommodate stories on game maps.

SUMMARY OF THE INVENTION

World-building, the process of developing both the narrative and physical world of a game, plays a vital role in the game's experience. Critically acclaimed independent and AAA video games are praised for strong worldbuilding, with game maps that masterfully intertwine with and elevate the narrative, captivating players and leaving a lasting impression. However, designing game maps that support a desired narrative is challenging, as it requires satisfying complex constraints from various considerations. Most existing map generation methods focus on considerations about gameplay mechanics or map topography, while the need to support the story is typically neglected. As a result, extensive manual adjustment is still required to design a game world that facilitates particular stories.

In embodiments of the invention, the problem is addressed by introducing an extra layer of plot facility layout design that is independent of the underlying map generation method in a world-building pipeline. Concretely, a system leverages Reinforcement Learning (RL) to automatically assign concrete locations on a game map to abstract locations mentioned in a given story (plot facilities), following spatial constraints derived from the story. A decision-making agent moves the plot facilities around, considering their relationship to the map and each other, to locations on the map that best satisfy the constraints of the story.

Embodiments of the invention consider input from multiple modalities: map images as pixels, facility locations as real values, and story constraints expressed in natural language. A method generates datasets of facility layout tasks, creates an RL environment to train and evaluate RL models, and further analyzes the behaviors of the agents through a group of comprehensive experiments and ablation studies, aiming to provide insights for RL-based plot facility layout design.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In embodiments of the invention, the problem is approached by introducing an extra layer of plot facility layout design that is independent to the underlying map generation method in a world-building pipeline. Embodiments of the invention may have some inspiration by the philosophy behind [Dormans and Bakkes 2011], which distinguishes the abstract space defined by the story (referred to as missions) and the concrete space defined by the actual geometric layout of a game map. The story is accommodated by mapping the former into the latter. While [Dormans and Bakkes 2011] focuses on action adventure games with discrete "scenes" connected by "passages", embodiments of the invention impose very little assumption on methods used for story and map generation, and in particular target workflows for modern open world games.

Embodiments of the invention introduce the concept of plot facilities, which are abstract locations mentioned in the given story. A set of constraints are derived from the story in terms of the spatial relationships between plot facilities and elements in the underlying map. Given an underlying map, the layout of the plot facilities are arranged on top of the map to satisfy the constraints. Embodiments of the invention are compatible with any map generation technique in the sense that the underlying map can be hand-crafted, procedurally generated, or even from a Geographic Information System (GIS) such as Google Maps.

Figure 1:
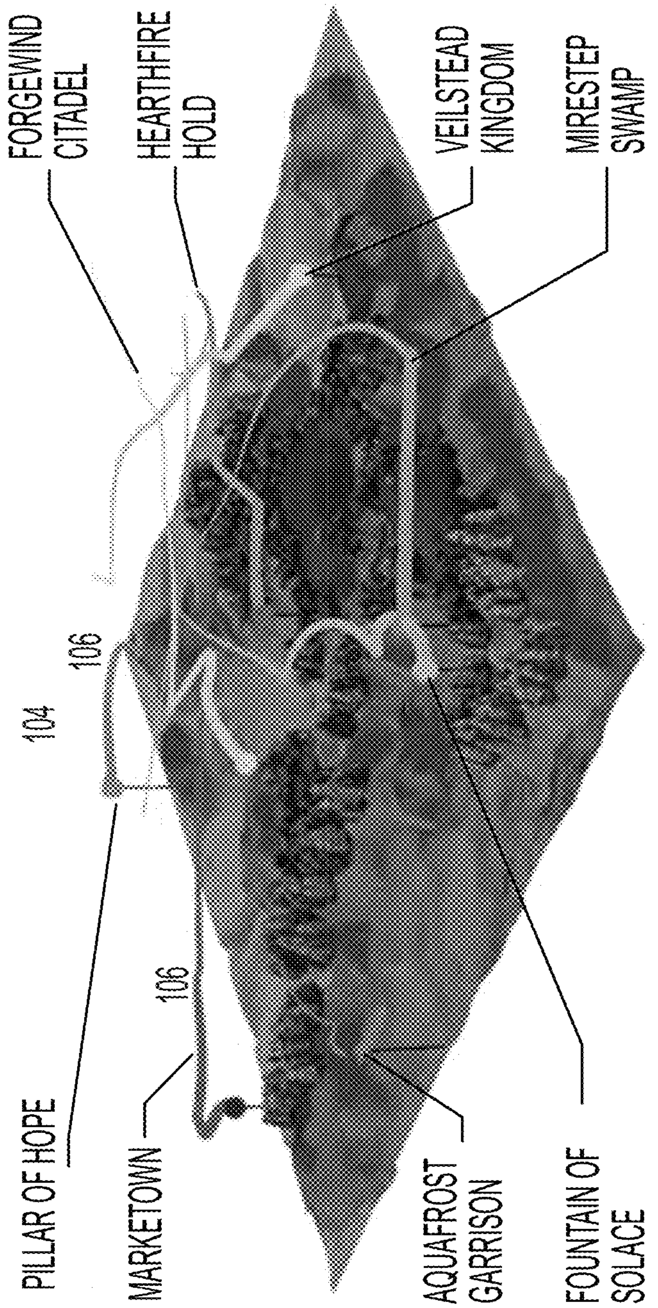
FIG. 1 illustrates the process of deriving spatial constraints from a story and using reinforcement learning to layout locations mentioned in the story in accordance with one or more embodiments of the invention.

FIG. 1 illustrates the process of deriving spatial constraints from a story and using reinforcement learning to layout locations mentioned in the story on a map to satisfy the constraints (in accordance with one or more embodiments of the invention). Details for FIG. 1 are described below.

Figure 2:
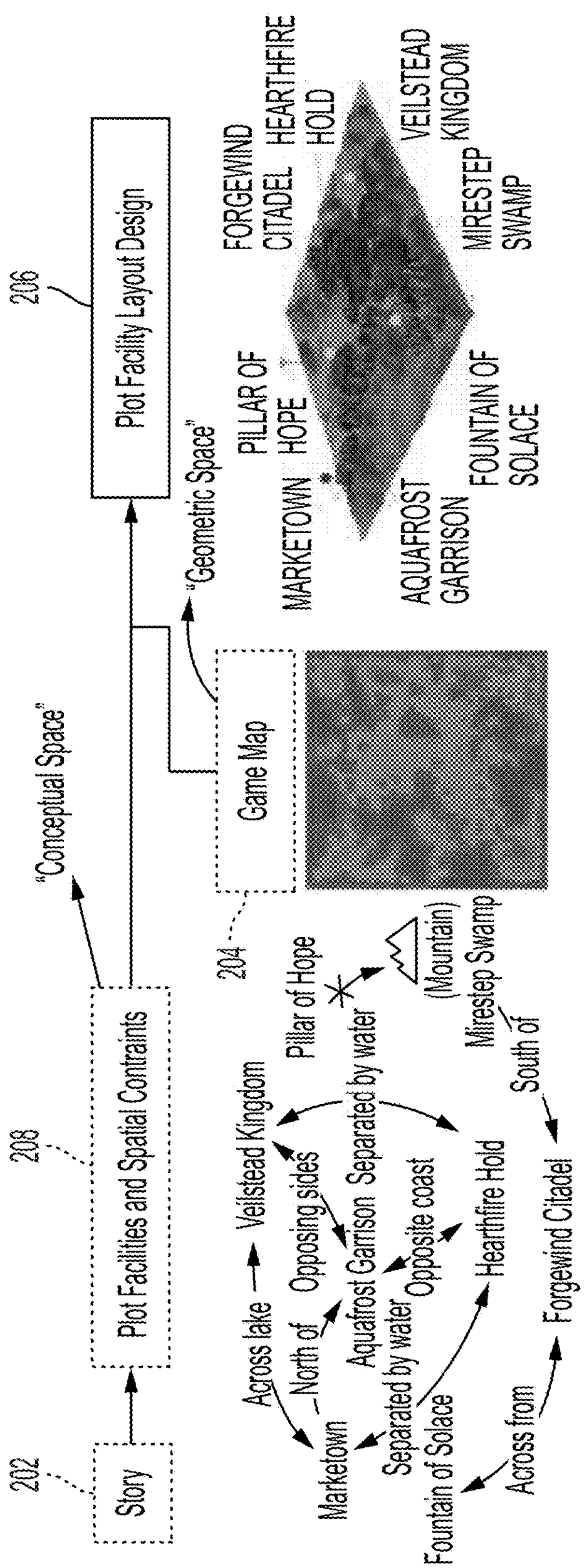
FIG. 2 illustrates a world building approach in accordance with one or more embodiments of the invention.

FIG. 2 illustrates a world building approach in accordance with one or more embodiments of the invention. More specifically, FIG. 2 illustrates the process of accommodating a story 202 on a map 204 with a plot facility layout design process/task 206. The focus of one or more embodiments of the invention is on the plot facility layout design task 206. To demonstrate a concrete pipeline, embodiments work with a specific procedural map generation method described below, and in an end-to end example described below, story constraints 208 are extracted from a free-text story description 202 using a large language model.

Further, embodiments of the invention provide a system that leverages Reinforcement Learning (RL) to automatically assign geometric locations on a game map to plot facilities following geographic and spatial constraints 208 derived from the story 202—such as being in a forest and far from another plot facility. A decision-making agent moves the plot facilities around, considering their relationship to the map and each other, to locations on the map 204 that best satisfy the constraints of the story 202. Embodiments consider input from multiple modalities: map images as pixels, facility locations as real values, and story constraints expressed in natural language. Embodiments demonstrate that an RL approach to plot facility layout design 206 is fast in providing solutions, and can quickly adapt to user intervention, making it suitable for real-time human-AI co-design workflow.

In addition, embodiments of the invention provide an exemplary dataset of facility layout tasks and a gym-like environment to train and evaluate the RL models. The exemplary dataset contains 10,000 plot facility layout design tasks involving 12 types of spatial constraints and maximum 10 plot facilities each task, based on a set of procedurally generated terrain maps. The results of applying different strategies to address the observation are presented herein.

In summary, embodiments of the invention provide:

- A plot facility layout design 206 as a novel approach to address the problem of supporting stories with game maps, which is compatible with most story and map generation methods.
- A dataset of plot facility layout tasks and a gym-like environment to train and evaluate the RL models.
- Baseline results on an RL approach to plot facility layout design 206.

Problem Formulation

Overview

Put simply, embodiments of the invention attempt to assign every location mentioned in a narrative/story 202 to an appropriate location on the game map 204. Inspired by [Dormans and Bakkes 2011], the narrative and the geometric layout of a game map are viewed as independent of each other, except that the geometric layout should accommodate the narrative. The notion of plot facilities 208 are introduced, which are conceptual "locations" mentioned in the story 202. These "locations" are abstract in the sense that they don't correspond to any concrete geometric locations (yet). For example, the event "the hero finds an injured dwarf in the forest" happens at some place. There can be multiple locations on the map 204 where this "abstract location" can be "instantiated", as long as it does not contradict with the story 202—in this example it should be inside a forest area.

A set of constraints 208 can be derived from the story 202 for determining whether a particular instantiation of plot facilities is valid. The set of all plot facilities and the constraints 208 form a conceptual space defined by the story 202, which is at a higher abstraction level than a concrete game map 204. The problem is then to assign geometric locations on the map 204 to the plot facilities such that the constraints are satisfied—this problem is called plot facility layout design 206. A plot facility layout is essentially a mapping between the conceptual space defined by the story 202 and the geometric space defined by the game map 204.

In the following description, an RL-based method for this problem is presented. To demonstrate a concrete map generation pipeline, embodiments of the invention specifically work with terrain maps consisting of polygons, where each polygon is assigned a biome.

Plot Facility Layout Design 206

A (facility layout) task is defined as a tuple $$\langle \mathcal{F}, \mathcal{T}, \mathcal{C} \rangle$$

where

- $\mathcal{F}$ is the set of (plot) facilities. Each facility has an identifier to be referred to by the constraints.
- $\mathcal{T}$ is a set of polygons on the map 204, each associated with a biome type (e.g., OCEAN, PLAINS, etc.).
- $\mathcal{C}$ is a set of spatial constraints over facilities in $\mathcal{F}$ and terrain types, each associated with a natural language utterance, such as "Fordlen Bay and Snapfoot Forest are separated by the ocean."

An (optimal) solution to a task is an assignment of coordinates to all the facilities in $\mathcal{F}$, so that a maximum number of the constraints in $\mathcal{C}$ are satisfied considering their relations with each other and the polygons in $\mathcal{T}$. The goal is to train a general RL agent to be able to find solutions to any arbitrary task.

RL Formulation

Essentially, each plot facility layout design task can be viewed as sequentially moving a set of plot facilities F on a map 204, thus, one may define the plot facility layout design 206 as a sequential Markov decision process (MDP), which consists of the following key elements:

- Each state $s \in S$ consists of three modalities: 1) a pixel-based image representing the map, 2) a real-valued vector representing essential information of the plot facilities, and 3) a group of utterances representing the constraints. These three strategies are explored to derive the embeddings from the image and the utterances, resulting in three state dimensions: 1782, 4422, and 5702. More details about the state are described below.
- Each action $a \in A$ is a 2 dimensional vector of real-valued $[\Delta x, \Delta y]$ for one plot facility. In each round, plot facilities are moved one at a time in a fixed order, with the state and rewards updated after each movement.
- The reward (for each step) $r_t$ is +1 when all the constraints are satisfied, and is the average satisfaction score from all the constraints minus 1 when partial constraints are satisfied:

$$r_t = \begin{cases} 1, \\ \frac{1}{n}\sum_{i=1}^{n} s_i - 1, \end{cases}$$

if all constraints are satisfied, otherwise where n is the number of constraints and $s_i$ is the satisfaction score for each constraint. The satisfaction score for each type of constraint is within [0, 1] and is defined based on hand crafted heuristic function determining to what extent the facility layout forms the corresponding geometric formation. As used herein, e.g., closeTo(x,y) is negatively correlated to the distance between x and y, and reaches 1 when their distance is less than a certain threshold. The range of the reward $r_t$ is $[-1, 0] \cup \{1\}$.

The transition function is deterministic, where $s_{t+1}=f(s_t, a_t)$.

Each episode is terminated when all the constraints are satisfied or at 200 timesteps.

Embodiments of the invention train an RL agent to learn an optimal policy $\pi_\theta$ in order to maximize the expected discounted rewards:

$$\max_{\pi_\theta} E_{\mathcal{T}\sim\pi_\theta}\left[\sum_{t=0}^{T} \gamma^t r(s_t, a_t)\right] \quad (1)$$

where trajectory $\tau=(s_0, a_0, s_1, a_1, \ldots, s_T, a_T)$, $\theta$ is the parameterization of policy $\pi$, and $\gamma$ is the discounted factor.

Task Dataset Generation

For training the RL model, a dataset of 10, 000 facility layout tasks was generated. Each task requires arranging the layout of maximum 10 plot facilities on top of a procedurally generated map, w.r.t. a set of maximum 10 spatial constraints. Maps consist of 9 biome types and the constraints are generated based on 12 constraint types. On average, a random agent has around 30% success rate to solve a single task.

Map Generation

A procedural map generation approach is employed that may be adapted from the work of Patel and its implementation by Dieu et al. [2023]. Rather than beginning with basic elements, such as elevation and moisture levels, and subsequently deducing coastlines and river locations, this method begins by creating rivers and coastlines and then adapts elevations and moisture to render them more plausible. The procedure is divided into several steps:

(1) A grid of Voronoi polygons is generated from random points with varying density in $[0,1]^2$ space. Each point is then replaced with the centroid of its polygon region and Lloyd relaxation [Lloyd 1982] is used to ensure an even distribution.

(2) Coastline generation employs a flooding simulation. Embodiments of the invention initially mark edges touching the map borders and those in random proximate areas as water edges. Flooding continues until a desired number of water edges are generated. Then, random inland edges are selected as lake edges and flooding is continued. Tiles are designated as water if their borders exceed a predefined minimum water ratio. Four terrain types are assigned: ocean, coast, lake, and land, based on their relation to water edges and neighboring tiles.

(3) Elevation assignment is determined by the distance from the coast, with elevation normalized to a given height distribution, resulting in fewer high points and smoother terrain.

(4) Rivers are created along the downhill path from randomly selected mountain corners to the nearest lake or ocean.

(5) Moisture levels are assigned according to the distance from freshwater sources, such as lakes and rivers.

Figure 8:
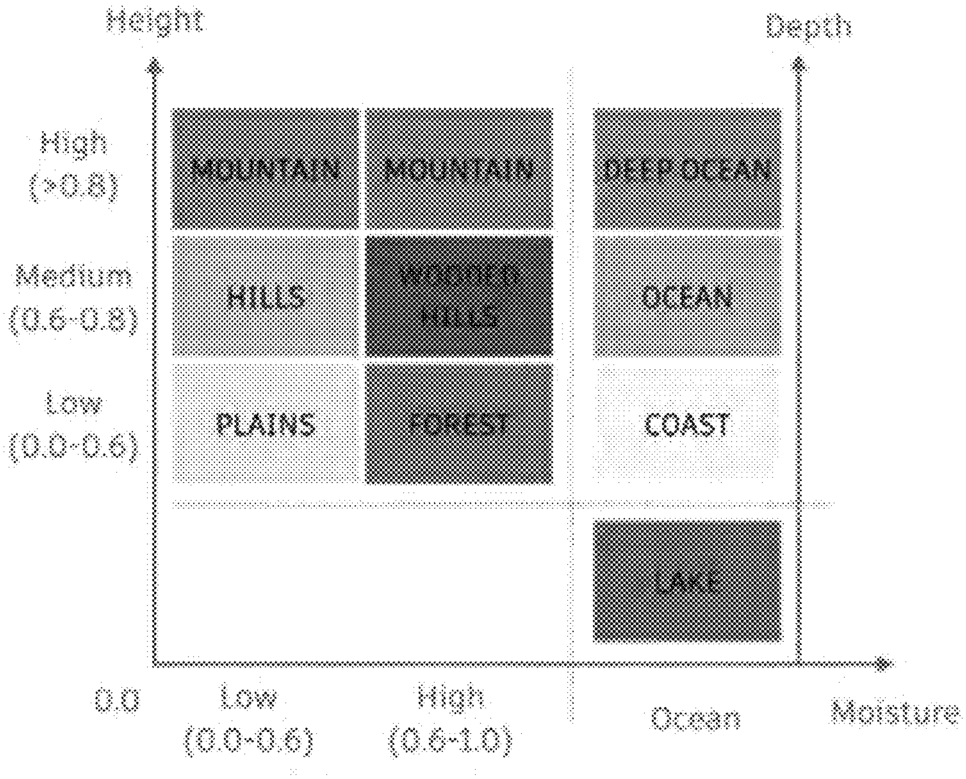
FIG. 8 illustrates a Whittaker diagram for Biome types in accordance with one or more embodiments of the invention.

(6) Biome assignment for each polygon depends on the combination of moisture and elevation, as illustrated in the Whittaker diagram in FIG. 8. More specifically, FIG. 8 illustrates a Whittaker diagram for Biome types in accordance with one or more embodiments of the invention. As illustrated, for low moisture, as the height/elevation increases, the biome transitions from plains, to hills, to mountain. With high moisture content, as elevation increases, the biome changes from forest to wooded hills to mountain. Lastly, with ocean moisture, the biome changes as the elevation increases from lake to coast to ocean to deep ocean.

For dataset generation, 100 maps with 1,000 cells each were produced. These maps are then converted to RGB images, suitable for input to neural network-based reinforcement learning agents.

Constraint Generation

Synthetic facility layout tasks are generated by associating a set of random constraints to randomly sampled maps. One or more embodiments consider a list of 12 constraint types, listed in Table 1, along with their number of occurrences in the 10, 000 task dataset. A constraint type ConstraintType($b_1, \ldots, b_m, p_1, \ldots, p_n$) is instantiated to become a constraint by substituting each of $b_1, \ldots, b_m$ with a biome type, and each of $p_1, \ldots, p_m$ with a plot facility id ($m \geq 0$, $n \geq 0$).

TABLE 1

Constraint types included in the 10,000-task dataset (each pi represents a plot facility)

| Constraint Types | Meaning | Frequency |
|---|---|---|
| AcrossBiomeFrom($b_1$, $p_1$, $p_2$) | $p_1$ is across biome $b_1$ from $p_2$ | 24895 |
| Outside($b_1$, $p_1$) | $p_1$ is outside biome $b_1$ | 5090 |
| Inside($b_1$, $p_1$) | $p_1$ is inside biome $b_1$ | 1117 |
| AwayFrom($b_1$, $p_1$) | $p_1$ is away from biome $b_1$ | 773 |
| CloseTo($b_1$, $p_1$) | $p_1$ is close to biome $b_1$ | 2362 |
| ToTheSouthOf($b_1$, $p_1$) | $p_1$ is to the south of biome $b_1$ | 739 |
| ToTheNorthOf($b_1$, $p_1$) | $p_1$ is to the north of biome $b_1$ | 746 |
| ToTheWestOf($b_1$, $p_1$) | $p_1$ is to the west of biome $b_1$ | 805 |
| ToTheEastOf($b_1$, $p_1$) | $p_1$ is to the east of biome $b_1$ | 727 |
| CloseTo($p_1$, $p_2$) | $p_1$ is close to $p_2$ | 103 |
| AwayFrom($p_1$, $p_2$) | $p_1$ is away from $p_2$ | 4215 |
| InBetween($p_1$, $p_2$, $p_3$) | $p_1$ is between $p_2$ and $p_3$ | 416 |
| OnSouth($p_1$) | $p_1$ is on the south of the map | 283 |
| OnNorth($p_1$) | $p_1$ is on the north of the map | 295 |
| OnEast($p_1$) | $p_1$ is on the east of the map | 291 |
| OnWest($p_1$) | $p_1$ is on the west of the map | 285 |
| ToTheSouthOf($p_1$, $p_2$) | $p_1$ is to the south of facility $p_2$ | 2774 |
| ToTheNorthOf($p_1$, $p_2$) | $p_1$ is to the north of facility $p_2$ | 2715 |
| ToTheWestOf($p_1$, $p_2$) | $p_1$ is to the west of facility $p_2$ | 2775 |
| ToTheEastOf($p_1$, $p_2$) | $p_1$ is to the east of facility $p_2$ | 2779 |
| VisibleFrom($p_1$, $p_2$) | $p_2$ is visible from $p_1$ | 616 |

For each constraint type, a heuristic function is defined for evaluating an existing facility layout w.r.t. any instantiation of the constraint type. The function returns a real number in [0.0, 1.0] with 1.0 meaning fully satisfied and 0.0 completely not satisfied. These functions are used to check if the randomly generated constraints are satisfied by a random layout. They may also be used for computing the reward as described above. Tasks are then generated following Algorithm 1. Note that, as the constraints are extracted from an example layout, this procedure guarantees that the generated tasks are solvable.

ALGORITHM 1: Facility Layout Task Generation

Input: A set of map MAP, maximum number of facilities N, a set of constraint types CT, minimum and maximum number of constraints $M_1$ and $M_2$
Output: A facility layout task ⟨F, T, C⟩
1. Randomly sample a map T from MAP;
2. Randomly assign a location to facilities $obj_1 \ldots obj_N$ on the map T;
3. For each constraint type in CT, generate all possible instantiations of it w.r.t. $obj_1 \ldots obj_N$ and biome types. Evaluate each of them against the current map ,adding the true ones to a set C';
4. Sample a set of statements from C' sized between $M_1$ and $M_2$, obtaining C;
5. For each statement in C, use large language model such as GPT [Brown et al. 2020] to rephrase it with a natural language sentence, resulting in a set of NL utterances $C^{NL}$;
6. return task ⟨$\{obj_1 \ldots obj_N\}$, T, $C^{NL}$ ⟩.

Experiments & Analysis

Experiment Setup

State Space in Details. The state space may include three (3) types of inputs:

- the map is represented by a pixel-based image defined as (42×42×3).
- the constraints are represented by natural language utterances or one-hot vectors, depending on the embedding strategies described in the following paragraph.
- Each plot facility's information is represented by a vector, consisting of its position [x,y] on the map, a binary motion indicator signifying if it is its turn to move or not, and a unique identifier.

RL Training Details. All of the policies may be trained using Proximal Policy Optimization (PPO) [Schulman et al. 2017]. Table 2 presents the major hyper-parameters used for training the policies. For the hidden layers, each set of experiments are run on the two options in the table and the one with the higher reward is chosen to calculate the success rates. The rest of the hyper-parameters are the same as the default values from RLlib (see https://docs.ray.io/en/latest/rllib/index.html).

TABLE 2

Major hyperparameters used for training the policies

| Hyperparameter | Default Value |
|---|---|
| lr | 1e−4 |
| gamma | 0.99 |
| lambda | 0.95 |
| clip_param | 0.2 |
| num_sgd_iter | 30 |
| sgd_minibatch_size | 128 |
| train_batch_size | 2000 |
| num_workers | 7 |
| fcnet_hiddens | [1024, 512] or [1024, 512, 512] |

To handle the multi-modal observation space, embodiments of the invention employ pre-trained models to independently extract embeddings from the map (image) and constraint (natural language) inputs. These embeddings are subsequently concatenated with the informational vector and provided as inputs to the policy network. Specifically, three strategies are designed for deriving the embeddings:

- NL-based: using ResNet [He et al. 2016] for maps and SentenceTransformer [Reimers and Gurevych 2019] for constraints.
- CLIP-based: using CLIP [Radford et al. 2021] for both maps and constraints.
- Relation-based: using ResNet for maps, and each constraint is encoded as a one-hot vector, representing the constraint type, followed by three one-hot vectors indicating the specific plot facilities to instantiate the constraint with.

In experiments, a limit of 10 was set for both the number of plot facilities and the number of constraints. Table 3 provides the state dimension breakdown details from the three embedding strategies

TABLE 3

| Embedding | Embedding Dimension | | | |
|---|---|---|---|---|
| Strategy | total | terrain | constraints | plot facilities |
| NL-based | 4422 | 512 | 10 * 387 | 10 * 4 |
| CLIP-based | 5702 | 512 | 10 * 512 | 10 * 4 |
| Relation-based | 1782 | 512 | 10 * 123 | 10 * 4 |

Simulated Concurrent Movement. A truly concurrent movement scheme updates the observation after all facilities move, which makes it difficult to contribute a change in constraint satisfaction to an individual facility's movement. Exploratory experiments also show that this results in undesired behaviors such as livelocks. For example, two plot facilities on the same side of a lake that are targeting being across the lake from each other might both move simultaneously to the other side of the lake, resulting in them still being on the same side of the lake as one another. Therefore, embodiments of the invention simulate concurrent movement with a turn-based movement scheme at micro-level: at each round, facilities are moved one by one, each with a maximum length of movement, with observation updating after each facility is moved; At a macro level the movement is concurrent in the sense that all of the facilities make progress each round.

Figure 3:
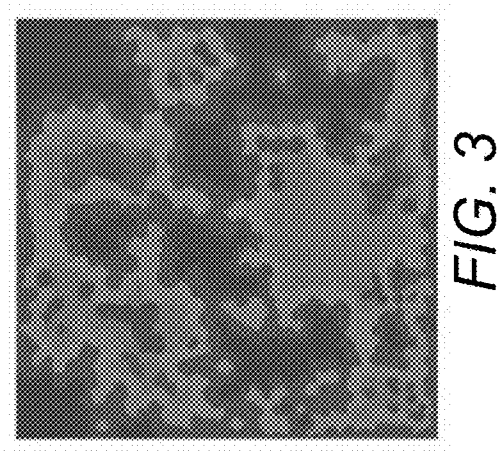
FIG. 3 illustrates an exemplary map with a single plot facility layout task in accordance with one or more embodiments of the invention.
Figure 4:
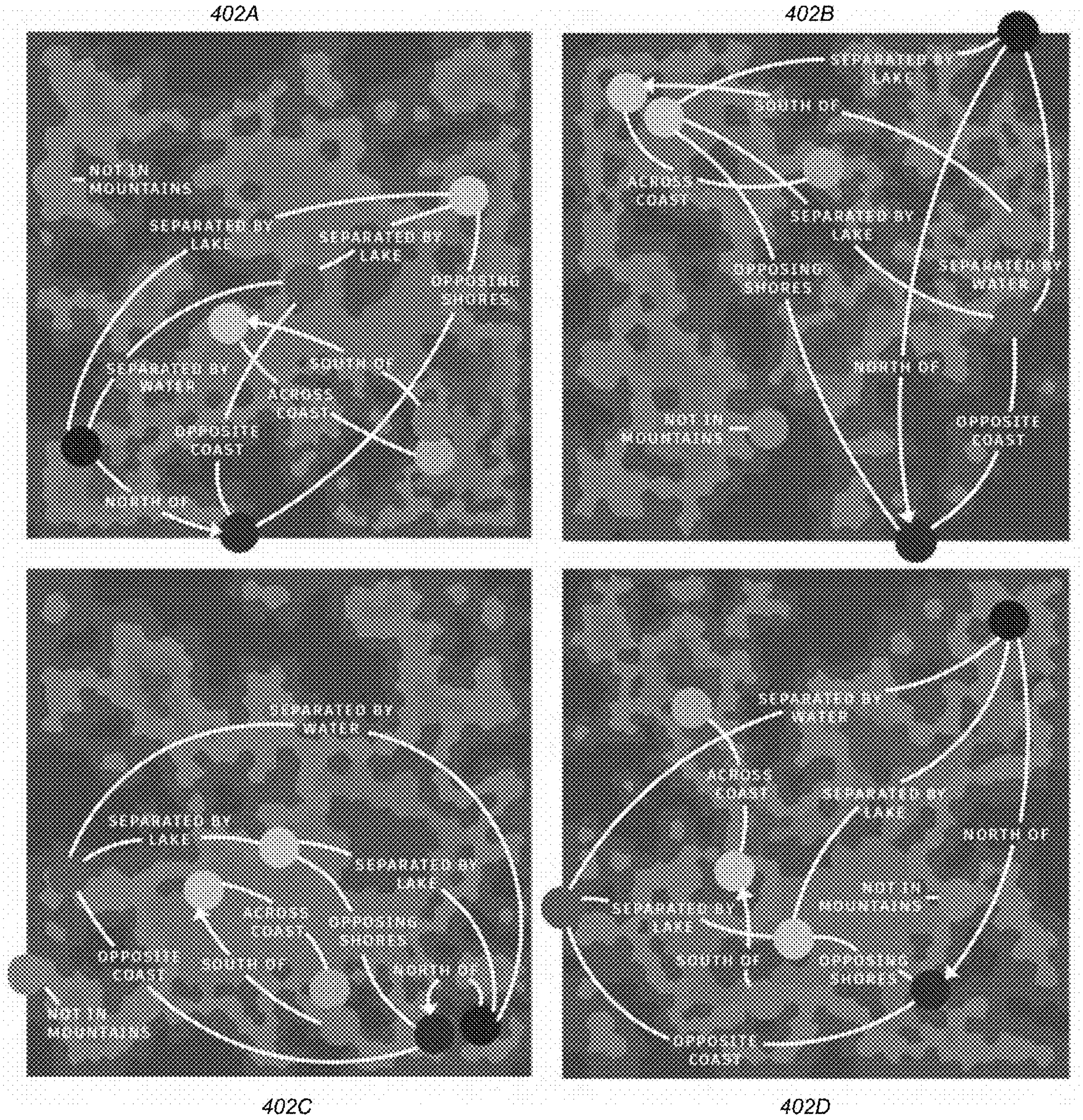
FIGS. 4A-4D illustrate the same story accommodated on four (4) different maps 402A-402D by rolling out a trained RL policy in accordance with one or more embodiments of the invention.

The following toy experiment describes an exemplary actual concurrent vs. simulated concurrent movement. An additional toy experiment was performed to compare a true concurrent movement scheme and a simulated concurrent movement scheme of plot facilities. The experiment involves a single plot facility layout task with the map shown in FIG. 3, two plot facilities $p_1$ and $p_2$ and two constraints requiring $p_1$ and $p_2$ to be inside the lake, respectively. The agent with actual concurrent movement scheme moves all the plot facilities at a single step, and the observation is updated only when all the plot facilities are moved, while the agent with simulated concurrent movement scheme only moves one plot facility for a small distance at one step.

Table 4 reports the success rate from a random agent, an RL model trained with actual concurrent movement and an RL model trained with simulated concurrent movement.

TABLE 4

Success rate (%) comparison among random agent, an RL model trained with actual concurrent movement and an RL model trained with simulated concurrent movement

| Random | Actual Concurrent | Simulated Concurrent |
|---|---|---|
| 7.29% | 0.14% | 93% |

A possible explanation for the poor performance of the actual concurrent movement setting is that in the setting it's hard to contribute global constraint satisfaction change to individual facility's movement.

Quantitative Results

Embodiments of the invention carried out three groups of experiments to investigate different aspects of the problem. Firstly, the performance of the three proposed embedding strategies on four small task sets were investigated with the results shown in Table 5:

TABLE 5

Success rate (%) comparison among three proposed baseline methods and a random agent across various task sizes. All training procedures in this table have a limit of 200,000 steps.

| Method | | Success Rate (%) Random initial positions 1 task | 5 tasks | 50 tasks | 100 tasks | Success Rate (%) 100 unseen tasks | | | |
|---|---|---|---|---|---|---|---|---|---|
| Random agent | | 23.9 | 30.3 | 30.5 | 30.9 | 32.2 | | | |
| | | | | | | 1-task policy | 5-task policy | 50-task policy | 100-task policy |
| Baseline | NL-Based | 84.1 | 48.2 | 38.5 | 38.4 | 34.8 | 33.3 | 35.1 | 38.0 |
| | CLIP-based | 99.9 | 49.0 | 38.0 | 35.6 | 32.5 | 30.2 | 36.0 | 35.5 |
| | Relation-based | 100.0 | 55.1 | 46.1 | 38.5 | 32.2 | 29.6 | 32.7 | 36.1 |

Secondly, embodiments of the invention examine the generalization of the RL agents on a 10,000-task set in Table 6.

TABLE 6

Success rate (%) comparison among two proposed baseline methods and a random agent on a 10,000 task set. All training procedures in this table have a limit of 2,000,000 steps.

| Method | | Success Rate (%) Random initial positions | 100 unseen tasks |
|---|---|---|---|
| | Random Agent | 38.7 | 32.2 |
| Baseline | NL-Based | 46.2 | 42.4 |
| | Relation-based | 44.8 | 36.8 |

Finally, embodiments of the invention studied the influence of maps and constraints on generalization in Table 7.

TABLE 7

Success rate (%) comparison among three 100-task datasets, each varying in map and constraint combinations. Each combination is paired with itsunique set of 100 unseen tasks. All training procedures in this table have a limit of 500,000 steps.

| Method | | Success Rate (%) Random initial positions: Varied Map Varied Constraints | Same Map Varied Constraints | Varied Map Same Constraint | Success Rate (%) 100 unseen tasks: Varied Map Varied Constraints | Same Map Varied Constraints | Varied Map Same Constraint |
|---|---|---|---|---|---|---|---|
| Random Agent | | 30.9 | 34.5 | 38.0 | 32.2 | 32.1 | 35.3 |
| Baseline | NL-Based | 38.4 | 42.8 | 79.2 | 38.0 | 39.9 | 70.4 |
| | Relation-Based | 38.5 | 48.1 | 77.5 | 36.1 | 40.1 | 68.9 |

For all of the tables, embodiments evaluate the trained policies on two conditions: Random-initial-positions refers to the policies evaluated with the same task sets for training but under different initial positions; 100-unseen-tasks reports success rates when the policies, each trained on their respective task set, are tested on 100 unseen tasks. Success is only considered when all the constraints are satisfied, and the success rates over 1000 rollouts are calculated; each rollout takes approximately 5 seconds to finish.

Table 5 demonstrates that all three baselines have outstanding performance on tackling one single hard task, with CLIP-based and Relation-based methods markedly outperforming the NL-based. The success rate for each baseline declines as the task set size increases, with the Relation-based method consistently surpassing the others in all four sets. The relatively low state dimension of the Relation-based method might contribute to the success. However, when deployed on the 100-unseen-task set, all three baselines exhibit a deficiency in generalization capability. It may be hypothesized that a large task set might enhance generalization, and to examine this, additional experiments were conducted, as reported in Table 6. Given the similar performance but longer training time of the CLIP-based method compared to the NL-based method in Table 5, embodiments may opt for the latter in experiments. While the success rates show improvement compared to the policies trained on the 100-task set, the increase isn't as significant as anticipated. Notably, the NL-based method slightly outperforms the Relation-based method, indicating that natural language embeddings' contextual information may offer an advantage when generalizing across diverse constraints. To investigate further the factors impeding generalization, embodiments study the influence of maps and constraints by training on three distinct sets of 100 tasks as depicted in Table 7. The results indicate that constraints pose a greater challenge to generalization, regardless of the encoding method employed.

Qualitative Results

In this section, a complete pipeline of the system is demonstrated, and insightful agent behaviors are highlighted through specific examples.

FIG. 1 illustrates a complete story-to-facility-layout pipeline. An exemplary story represented by FIG. 1 provides:

> The heroes meet in the bustling town of Marketown, situated to the north of Aquafrost Garrison. As tensions simmer, the heroes cross the great lake that separates Hearthfire Hold and Veilstead Kingdom. Along the way, they discover the beauty and power of Fountain of Solace and Forgewind Citadel, positioned across the coast from each other. Venturing into the surrounding wilds, they come across Mirestep Swamp, a place of great darkness, located to the south of Forgewind Citadel. They continue to Pillar of Hope, with towering mountains in the distance, where they uncover something much more sinister. As the heroes find themselves defending Hearthfire Hold and Aquafrost Garrison, which are on opposite sides of the coast, they must work together to confront the looming darkness that threatens the very existence of their world.

From the story, eight (8) plot facilities and six (6) constraints are extracted with a pre-trained large language model. Three additional constraints are then added to make the task more challenging and the complete requirements of the task are shown in Table 8.

TABLE 8

| Plot Facilities and Constraints Derived from Story in FIG. 1. |
|---|
| Veilstead Kingdom and Aquafrost Garrison are on opposing shores |
| Pillar of Hope is away from mountains |
| Mirestep Swamp is located south of Forgewind Citadel |
| Hearthfire Hold and Veilstead Kingdom are separated by a lake |
| Aquafrost Garrison is situated south of Marketown |
| Veilstead Kingdom is across the lake from Marketown |
| Fountain of Solace and Forgewind Citadel are positioned across the coast |
| A great body of water separates Hearthfire hold and Marketown |
| Hearthfire hold and Aquafrost Garrison are on opposite coasts |

The map 104 on the right shows the resulting plot facility layout, along with motion trails 106 (i.e., the larger lines) indicating traces to the final locations. FIGS. 4A-4D illustrate the same story accommodated on four (4) different maps 402A-402D by rolling out a trained RL policy. Arrows indicate directional relations. Note that the bottom right layout 402D failed to fulfill "Hearthfire Hold and Veilstead Kingdom should be separated by a lake". This shows typical failure examples from policies: the RL model only manages to satisfy a subset of the constraints. In other words, FIGS. 4A-4D demonstrate the same story accommodated on four (4) different maps by rolling out a trained RL policy. It may be observed that the same set of plot facilities can still maintain their relative spatial relations on completely different geometric layouts, which aligns with the perspective described in [Dormans and Bakkes 2011]: "The same mission (story) can be mapped to many different spaces, and one space can support multiple different missions (stories)". This capability enables designers to envision various interpretations of unspecified story details and potential story progressions.

Figure 5:
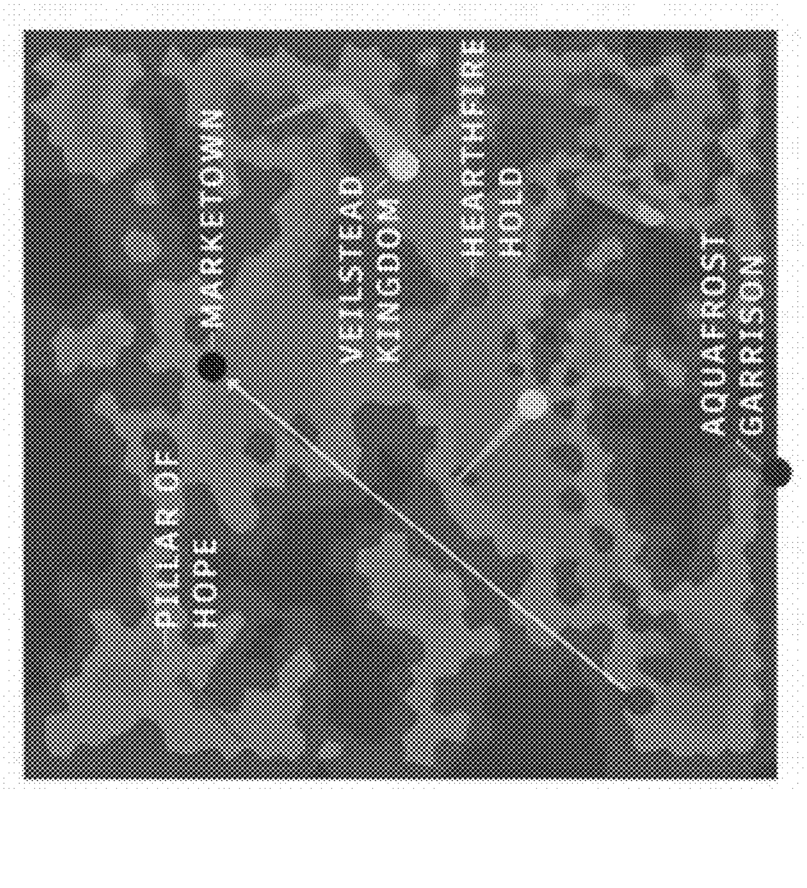
FIG. 5 illustrates plot facility re-adaptation after the user moves a plot facility in accordance with one or more embodiments of the invention.

FIG. 5 illustrates plot facility re-adaptation after the user moves Marketown to a different location. More specifically, FIG. 5 shows that RL policies of embodiments of the invention support accurate and fast re-adaptation after human intervention. After the location of Marketown is manually changed to the northeast part of the map, Veilstead Kingdom and Hearthfire Hold can adjust their locations to continue to be across the lake from Marketown, while Aquafrost Garrison stays at the same location, so all of the constraints are still satisfied. This potentially enables an interactive design process with a mixed-initiative interface [Cook et al. 2021; Smith et al. 2010; Yannakakis et al. 2014].

Figure 6:
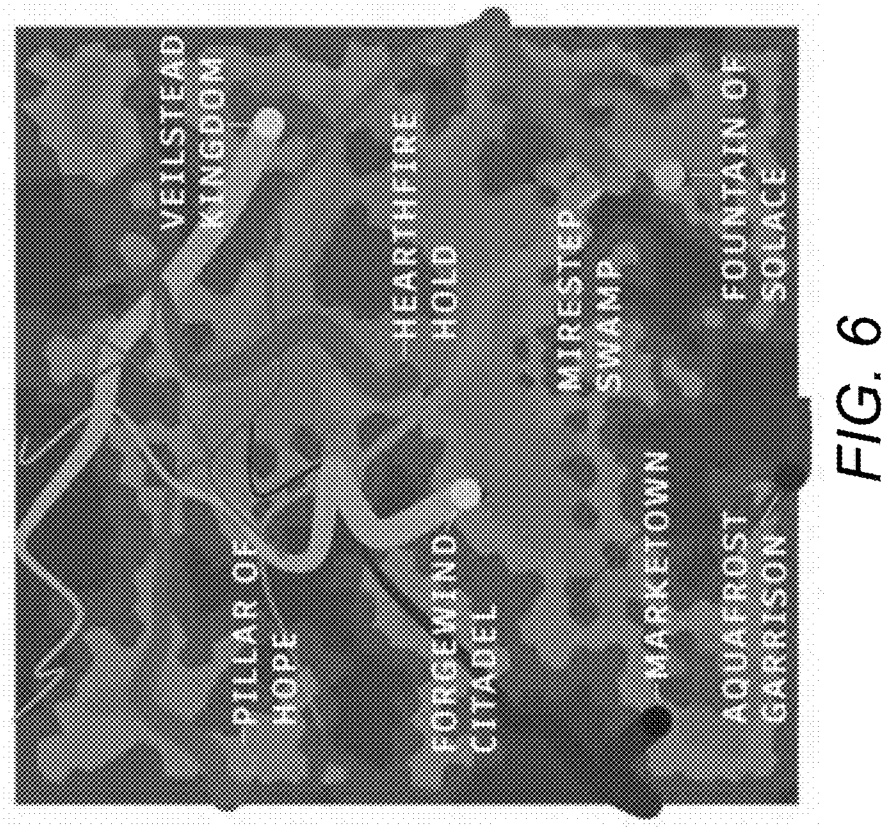
FIG. 6 illustrates an exemplary map in which cooperative behaviors are used to satisfy constraints in accordance with one or more embodiments of the invention.
Figure 7A:
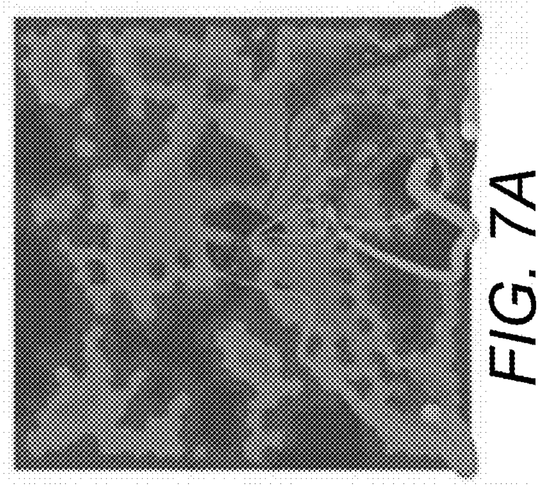
FIG. 7A illustrates agents with no constraints.
Figure 7B:
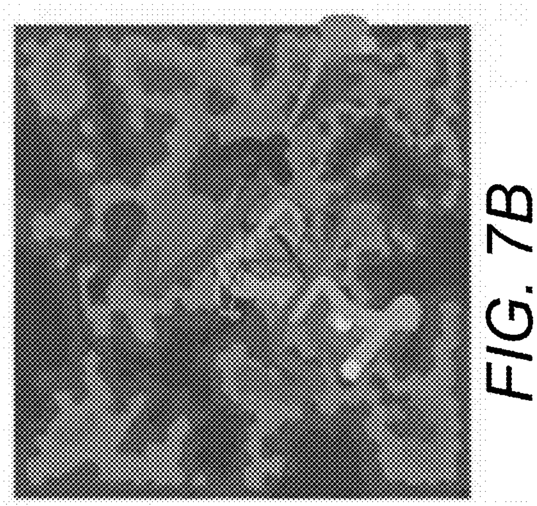
FIG. 7B illustrates random agents in accordance with one or more embodiments of the invention.

One may also observe cooperative behaviors to satisfy constraints as shown in FIG. 6. As illustrated, Marketown and Veilstead Kingdom must be across a lake from each other, while Aquafrost Garrison must be to the south of Marketown. Aquafrost Garrison was initially to the south of Marketown but as Marketown moves South to be across the lake from Veilstead Kingdom, Aquafrost Garrison moves even further south to continue satisfying its south of Marketown constraint. In many cases, one may notice that the plot facilities don't stop even though all the constraints are satisfied. To investigate this phenomenon, one can compare the motion trails from an RL policy and a random agent, as shown in FIGS. 7A and 7B. In this regard, FIG. 7A illustrates agents with no constraints, and FIG. 7B illustrates random agents. It can be seen that the agents have a strong preference of moving facilities towards the edge of the map without any constraints (i.e., when there are no constraints provided in the environment). Such a preference may be attributed to a task dataset's imbalance. One may further note that the map, constraints, and initial locations are all the same for the two settings (i.e., in FIGS. 7A and 7B).

Figure 9A:
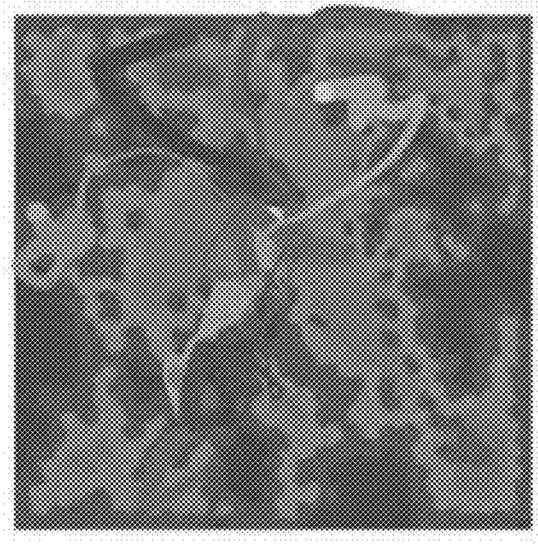
FIGS. 9A-9D illustrate motion trails at different stages in accordance with one or more embodiments of the invention.
Figure 9B:
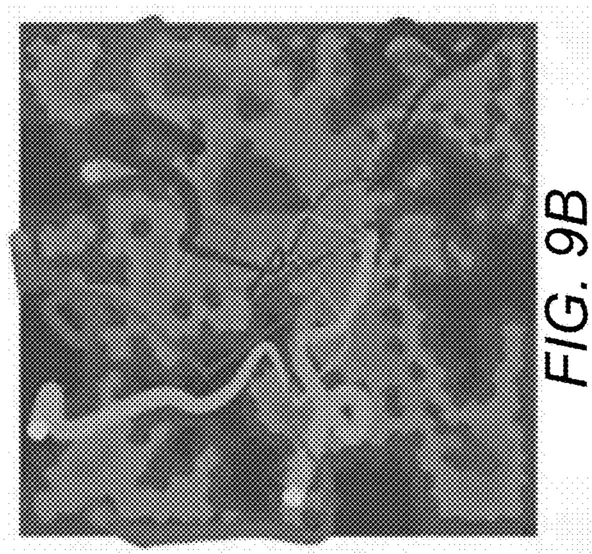
Figure 9C:
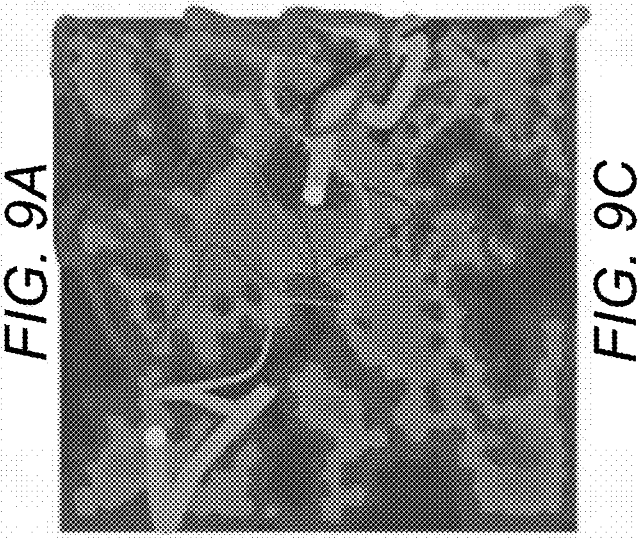
Figure 9D:
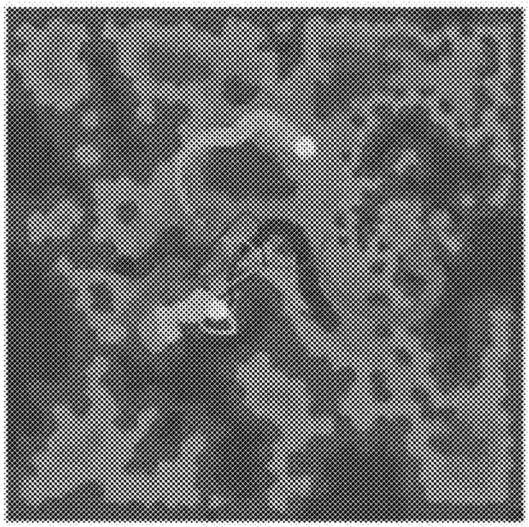

Table 1 shows a significantly higher proportion of AcrossBiomeFrom constraint. During training, AcrossBiomeFrom is satisfied as long as there is a biome between two plot facilities. If the two plot facilities are on different edges of the map, it's likely that they are across several different biomes from each other, which renders going to the edge an effective strategy. On the other hand, for human designers, this type of constraint usually implies that both facilities are close to the biome (e.g., "A and B are across a lake" generally implies that A and B are on the shore of the lake). In this sense, this moving-towards-edges behavior can be seen as a form of reward hacking. One may also visualize the motion trails from the RL policy at different training stages. FIGS. 9A-9D illustrate motion trails at different stages: FIG. 9A random agents; FIG. 9B after 30 iterations; FIG. 9C after 90 iterations; FIG. 9D after 133 iterations. Earlier stage models tend to have more random routes with a lot of circling back-and-forth, where later stage models tend to show clearer direction of progression. One may also note that the tendency of going to the edge is established at a very early training stage.

In addition to the reward hacking behavior, the imbalance of the dataset also contributes to several other failure cases. Since the constraints are generated based on random facility layouts, the probability is low to sample constraints requiring rare geometric configurations. For example, mountains usually take up only a very small portion of the map, which means it's hard to sample an "X is inside mountain" type of constraint. Similarly, it's more likely for two random facilities to be spawned away from each other than close to each other, which explains why there are significantly more AwayFrom than CloseTo constraints (see Table 1).

Alternative Embodiments

The use of handcrafted reward functions present challenges in both accurately reflecting the preferences of human designers and providing the right signal for training. One or more embodiments of the invention provide an understanding of the kinds of solutions that designers prefer by applying Reinforcement Learning from Human Preference, which offers potentially more accurate reflections of human intent [Christiano et al. 2017]. Moreover, we such embodiments may consider the satisfaction of all constraints as the benchmark for successful task resolution. In practice, a suboptimal solution that satisfies most of the constraints might be acceptable, and situations where the constraints are unsatisfiable are completely possible. In these cases, knowledge of designer preferences, or a mixed-initiative approach which allowed editing of the map, allows desirable solutions to be found.

The formulation and scalability of the RL approach, as well as the employed embedding strategies, provide advantages over the prior art. The use of a single RL agent responsible for handling all global information and managing all plot facilities may constitute a potential bottleneck, potentially limiting the scalability of the model in larger applications. Accordingly, embodiments of the invention may provide a distributed RL formulation, where each plot facility is treated as an independent RL agent. This adjustment may not only increase scalability but also enhance performance. Some embedding strategies may also result in an excessively high dimensional state space, with redundant static information in each episode, leading to sample inefficiency and suboptimal generalization capabilities of the RL agent. Such results lead to embodiments of the invention utilizing more sophisticated methods that can better leverage the embedded prior knowledge, consequently improving the generalization capabilities of the RL agent. In addition, such embodiments of the invention may improve both the efficiency and the performance of the RL approach in narrative generation tasks.

In embodiments of the invention, unlike [Valls-Vargas et al. 2013] and [Hartsook et al. 2011], a symbolic representation of the story is not assumed, and large language models may be used to derive spatial constraints from stories in free-form text. It remains to be investigated how effective this approach is, in regards to the reasoning capability of large language models.

The generality of the RL model may be crucial to one or more embodiments of the invention. Comparing settings (of embodiments of the invention) with existing works on using RL to play games, adapting to different maps is analogous to adapting to different levels of a game, while learning for different constraints is analogous to mastering games with different rules. Automatic curriculum learning [Portelas et al. 2021] may provide a way of reaching this high level of generalization capability. Maps and constraints may also be dynamically generated or selected rather than only training on a fixed set of scenarios. By systematically increasing the difficulty of scenarios, and their dissimilarity to those already encountered during training, embodiments of the invention may gradually expand the agent's abilities to tackle diverse challenges.

Logical Flow

Figure 10:
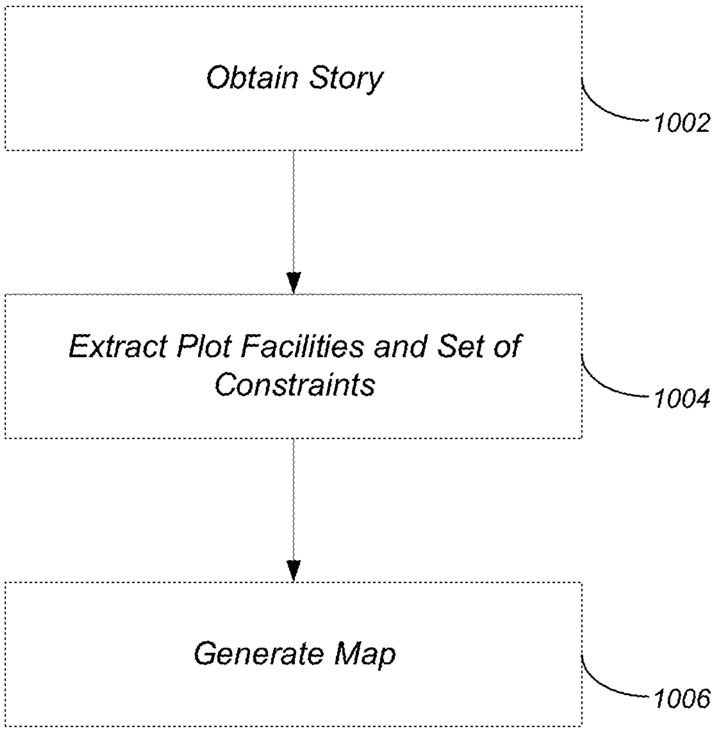
FIG. 10 illustrates the logical flow for building a game world in accordance with one or more embodiments of the invention.

FIG. 10 illustrates the logical flow for building a game world in accordance with one or more embodiments of the invention.

At step 1002, a story is obtained that provides/comprises a textual narrative of a sequence of events.

At step 1004, two or more plot facilities and a set of constraints are extracted from the story. Each of the two or more plot facilities is a conceptual location wherein an event happens in the story. Further, each constraint in the set of constraints defines a spatial relation between two or more of the plot facilities.

Figure 11:
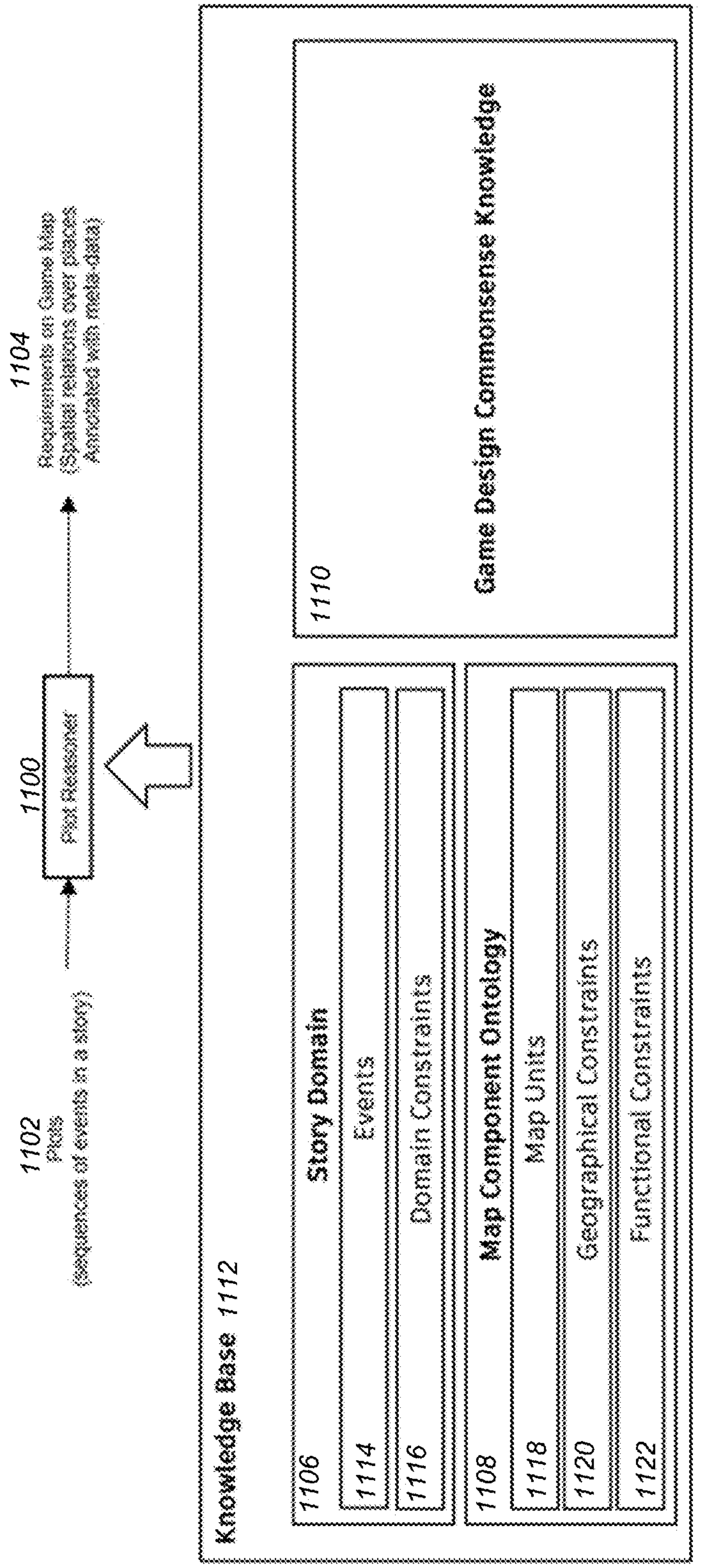
FIG. 11 illustrates the process for extracting spatial constraints from plots in accordance with one or more embodiments of the invention.

FIG. 11 illustrates the process for extracting spatial constraints from plots (i.e., plot reasoning) in accordance with one or more embodiments of the invention. More specifically, the two or more plot facilities are extracted from the story/plot 1102 using a plot reasoner 1100. The plot reasoner 1100 extracts the two or more plot facilities based on integrated information in a knowledge base 1112. In other words, the plot reasoning process (i.e., via the plot reasoner 1100) focuses on deriving spatial relations 1104 between entities (e.g., requirements on a game map including spatial relations over places annotated with meta-data) based on plot data 1102 (i.e., plots consisting of a sequence of events in a story). Such spatial relations will guide the generation of maps.

The knowledge base 1112 contains integrated information including: (i) a story domain that comprises/consists of events 1114 and domain constraints 1116; (ii) a map component ontology 1108 comprising/consisting of map units 1118, geographical constraints 1120, and functional constraints 1122; and (iii) game design common sense knowledge 1110. For example, based on the knowledge base 1112, one may determine that if a character can go from one location to another location in a short period of time, then the locations should be close to each other. Similarly, common sense knowledge 1110 may be utilized (e.g., a village cannot be in an ocean and/or if there are multiple locations where "boss fights" occur, they shouldn't be close together). The knowledge base 1112 integrates information from the various sources 1106-1110 and is used by the plot reasoner 1100 to extract the constraints and plot facilities, to generate the game map 1104.

The following provide examples of various constraints/rules covering game design knowledge 1106/geographical knowledge 1108/common sense knowledge 1110 in accordance with one or more embodiments of the invention:

% Plot facilities should be on land
location_relation("inside", "plot-facilities", "land").
% Terrain and geography related knowledge
% % Predefined terrain locations: terrain_forest, terrain_plains
% % cave should be on forest terrain
location_relation("inside", "cave", "mountain").
% % residential locations should be on plains
location_relation("inside", "residential", "plain").
% % residential locations should be close to water stream
location_relation("close_to", "residential, "water-stream").
location_relation("close_to", "water-stream", "water").
% % residential locations should be close to (at least one) other residential location
location_relation("close_to", "residential", "residential").
% % market should be on plains
location_relation("on", "market", "plains").
% % market should be close to at least one residential location
location_relation("close_to", "market", "residential").
% % Forest type of plot facility should be inside forest
location_relation("inside", "forest", "forest")
location_relation("close_to", "shrubbery", "forest").

In one or more embodiments, the two or more plot facilities and the set of constraints are each associated with a natural language utterance in the textual narrative. In such embodiments, the two or more plot facilities and the set of constraints may be extracted from the story using a large language model (e.g., ChatGPT).

At step 1006, a map is generated based on the set of constraints. The generating includes: (i) generating a terrain, wherein the terrain comprises two dimensional (2D) polygons and each 2D polygon is associated with a biome type; and (ii) assigning each of the two or more plot facilities to one or more points on the terrain, wherein the assigning complies with a maximum number of constraints in the set of constraints, and wherein the assigning utilizes reinforcement learning (RL) to optimize positions of the points.

In one or more embodiments, the assigning of each of the two or more plot facilities on the map to the one or more points is performed using a gradient descent method. In additional embodiments, the reinforcement learning (RL) includes training an RL Model, and utilizing the RL model to sequentially move each of the two or more plot facilities on the map to optimize the positions of the points. The training the RL model may include the generation of a dataset of multiple facility layout tasks. In such embodiments: (i) each task arranges a layout of a defined number of plot facilities on top of the map based on a subset of constraints from the set of constraints; (ii) the map includes/comprises a minimum number of the biome types; (iii) the map is procedurally generated; and (iv) each of the constraints in the subset of constraints is based on a constraint type from a set of constraint types.

Further to the above, the map may be procedurally generated. To procedurally generate the map, a grid of the 2D polygons may be generated from random points, wherein the 2D polygons are Voronoi polygons. Lloyd relaxation is then performed to ensure even distribution of polygon centroids. A coastline is then generated using a flooding simulation. Ruding such a coastline generation, tiles within the terrain are assigned a terrain type of ocean, coast, lake, or land. An elevation for each of the tiles is determined based on a distance from the coastline with the elevation normalized to a defined height distribution. A river can then be created along a downhill path from a randomly selected mountain corner to a nearest terrain type of lake or ocean. A moisture level is assigned to each tile according to a distance from a freshwater source. Thereafter, the biome type may be assigned to each of the 2D polygons based on a combination of the moisture level and elevation. This assignment may be performed using Whittaker Diagram maps as illustrated in FIG. 8. More specifically, elevation and moisture are graphed on an x-y plane and the Whittaker Diagram maps certain regions of this graph to certain biomes. Embodiments may then take the assigned moisture level and elevation of each cell and look up its corresponding biome assignment on the Whittaker Diagram.

When generating the constraints, embodiments of the invention may associate a set of random new constraints to a randomly sampled map. In such embodiments, the random new constraints are randomly selected from a set of predefined constraint types. Further, each predefined constraint type may consist of/comprises a biome placeholder and a plot facility placeholder. The predefined constraint types in the set of predefined constraint types may then be instantiated to become the random new constraints by substituting each biome placeholder with the biome type and substituting each plot facility placeholders with a plot facility identification. In addition, for each constraint type, a heuristic function may check if each random new constraint is satisfied by the randomly sampled map. The randomly sampled map may then be provided as the map representing the story.

In one or more embodiments of the invention, (user) input may be received moving one of the two or more plot facilities. In response, the system/method may autonomously update the map and the positions of the points based on the input. Such autonomously updating occurs in real time dynamically as the input is received.

Further, in one or more additional embodiments, the map may be used as a debugging tool. Such a debugging tool can be used to evaluate an interaction between the story and spacing between the two or more plot facilities (also referred to as the player experience). Further, the story may be modified or one or more of the two or more plot facilities may be moved based on the evaluation. For example, if something is not well balanced (in terms of where story events occur such as 17 different story events happening at a single location, or nothing is happening in a particular area, a plot facility may be moved to provide a better spatial balance. In another example, a particular area where many plot facilities are located/story events occur may be defined using higher fidelity than other areas. Accordingly, the debugging provides the capability to view/visualize/determine how a story progresses spatially over time.

Hardware Environment

Figure 12:
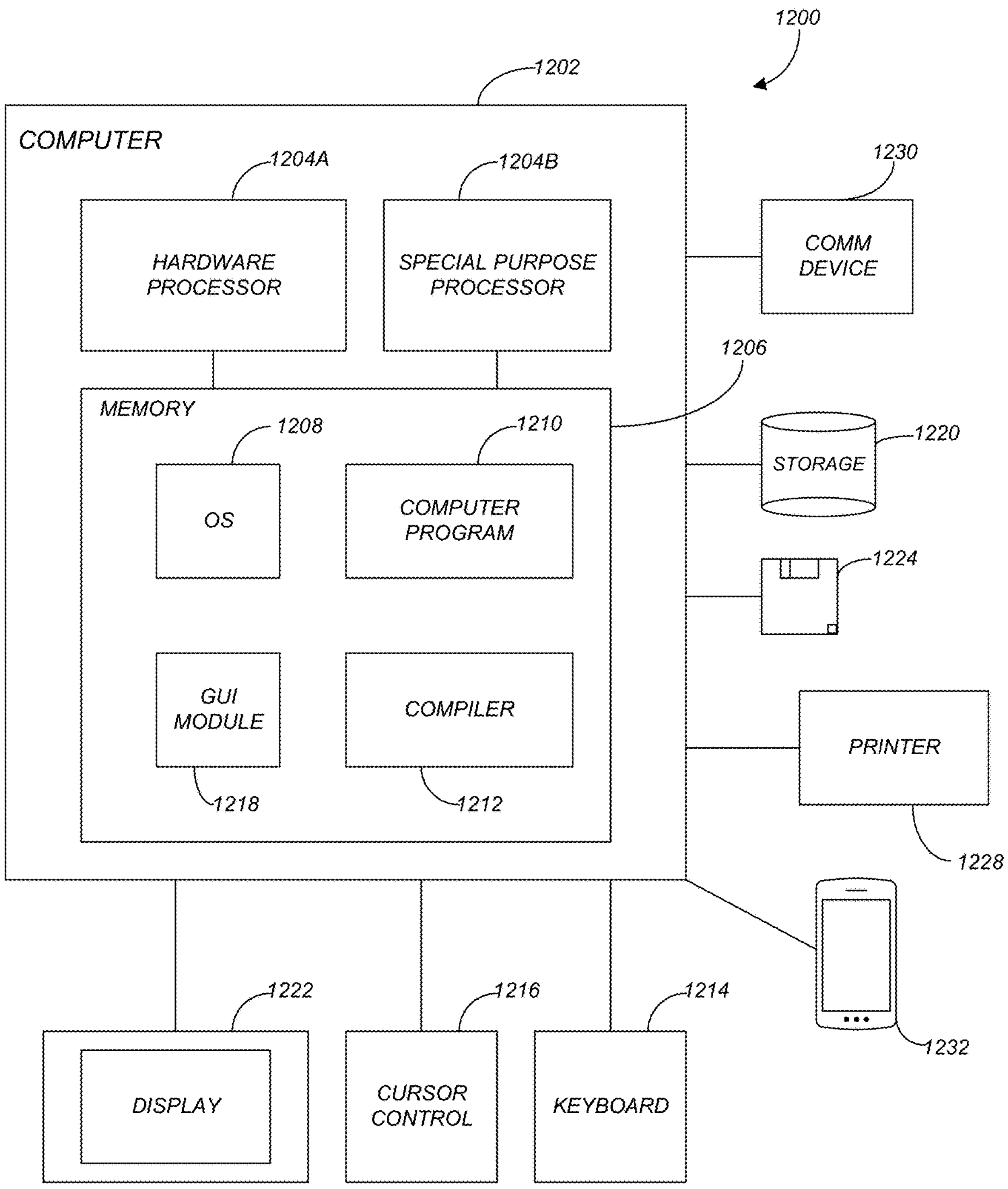
FIG. 12 is an exemplary hardware and software environment used to implement one or more embodiments of the invention.

FIG. 12 is an exemplary hardware and software environment 1200 (referred to as a computer-implemented system and/or computer-implemented method) used to implement one or more embodiments of the invention. The hardware and software environment includes a computer 1202 and may include peripherals. Computer 1202 may be a user/client computer, server computer, or may be a database computer. The computer 1202 comprises a hardware processor 1204A and/or a special purpose hardware processor 1204B (hereinafter alternatively collectively referred to as processor 1204) and a memory 1206, such as random access memory (RAM). The computer 1202 may be coupled to, and/or integrated with, other devices, including input/output (I/O) devices such as a keyboard 1214, a cursor control device 1216 (e.g., a mouse, a pointing device, pen and tablet, touch screen, multi-touch device, etc.) and a printer 1228. In one or more embodiments, computer 1202 may be coupled to, or may comprise, a portable or media viewing/listening device 1232 (e.g., an MP3 player, IPOD, NOOK, portable digital video player, cellular device, personal digital assistant, etc.). In yet another embodiment, the computer 1202 may comprise a multi-touch device, mobile phone, gaming system, internet enabled television, television set top box, or other internet enabled device executing on various platforms and operating systems.

In one embodiment, the computer 1202 operates by the hardware processor 1204A performing instructions defined by the computer program 1210 (e.g., a computer-aided design [CAD] application) under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208, to provide output and results.

Output/results may be presented on the display 1222 or provided to another device for presentation or further processing or action. In one embodiment, the display 1222 comprises a liquid crystal display (LCD) having a plurality of separately addressable liquid crystals. Alternatively, the display 1222 may comprise a light emitting diode (LED) display having clusters of red, green and blue diodes driven together to form full-color pixels. Each liquid crystal or pixel of the display 1222 changes to an opaque or translucent state to form a part of the image on the display in response to the data or information generated by the processor 1204 from the application of the instructions of the computer program 1210 and/or operating system 1208 to the input and commands. The image may be provided through a graphical user interface (GUI) module 1218. Although the GUI module 1218 is depicted as a separate module, the instructions performing the GUI functions can be resident or distributed in the operating system 1208, the computer program 1210, or implemented with special purpose memory and processors.

In one or more embodiments, the display 1222 is integrated with/into the computer 1202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose processor 1204B or in memory 1206. The special purpose processor 1204B may also be hardwired through circuit design to perform some or all of the operations to implement the present invention. Further, the special purpose processor 1204B may be a hybrid processor, which includes dedicated circuitry for performing a subset of functions, and other circuits for performing more general functions such as responding to computer program 1210 instructions. In one embodiment, the special purpose processor 1204B is an application specific integrated circuit (ASIC).

The computer 1202 may also implement a compiler 1212 that allows an application or computer program 1210 written in a programming language such as C, C++, Assembly, SQL, PYTHON, PROLOG, MATLAB, RUBY, RAILS, HASKELL, or other language to be translated into processor 1204 readable code. Alternatively, the compiler 1212 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1210 accesses and manipulates data accepted from I/O devices and stored in the memory 1206 of the computer 1202 using the relationships and logic that were generated using the compiler 1212.

The computer 1202 also optionally comprises an external communication device such as a modem, satellite link, Ethernet card, or other device for accepting input from, and providing output to, other computers 1202.

In one embodiment, instructions implementing the operating system 1208, the computer program 1210, and the compiler 1212 are tangibly embodied in a non-transitory computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of computer program 1210 instructions which, when accessed, read and executed by the computer 1202, cause the computer 1202 to perform the steps necessary to implement and/or use the present invention or to load the program of instructions into a memory 1206, thus creating a special purpose data structure causing the computer 1202 to operate as a specially programmed computer executing the method steps described herein. Computer program 1210 and/or operating instructions may also be tangibly embodied in memory 1206 and/or data communications devices 1230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1202.

Figure 13:
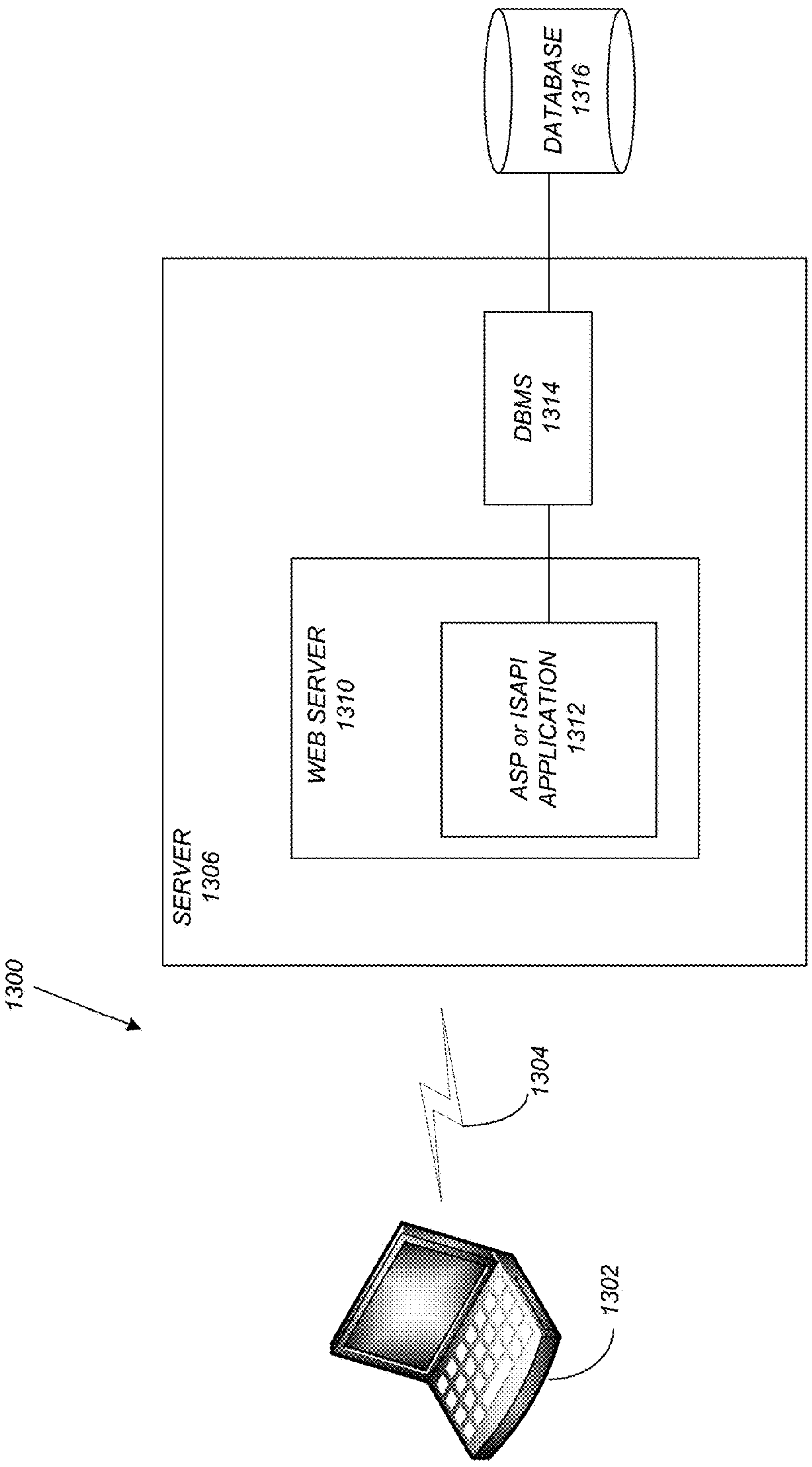
FIG. 13 schematically illustrates a typical distributed/cloud-based computer system in accordance with one or more embodiments of the invention.

FIG. 13 schematically illustrates a typical distributed/cloud-based computer system 1300 using a network 1304 to connect client computers 1302 to server computers 1306. A typical combination of resources may include a network 1304 comprising the Internet, LANs (local area networks), WANs (wide area networks), SNA (systems network architecture) networks, or the like, clients 1302 that are personal computers or workstations (as set forth in FIG. 12), and servers 1306 that are personal computers, workstations, minicomputers, or mainframes (as set forth in FIG. 12). However, it may be noted that different networks such as a cellular network (e.g., GSM [global system for mobile communications] or otherwise), a satellite based network, or any other type of network may be used to connect clients 1302 and servers 1306 in accordance with embodiments of the invention.

A network 1304 such as the Internet connects clients 1302 to server computers 1306. Network 1304 may utilize ethernet, coaxial cable, wireless communications, radio frequency (RF), etc. to connect and provide the communication between clients 1302 and servers 1306. Further, in a cloud-based computing system, resources (e.g., storage, processors, applications, memory, infrastructure, etc.) in clients 1302 and server computers 1306 may be shared by clients 1302, server computers 1306, and users across one or more networks. Resources may be shared by multiple users and can be dynamically reallocated per demand. In this regard, cloud computing may be referred to as a model for enabling access to a shared pool of configurable computing resources.

Clients 1302 may execute a client application or web browser and communicate with server computers 1306 executing web servers 1310. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1302 may be downloaded from server computer 1306 to client computers 1302 and installed as a plug-in or ACTIVEX control of a web browser. Accordingly, clients 1302 may utilize ACTIVEX components/component object model (COM) or distributed COM (DCOM) components to provide a user interface on a display of client 1302. The web server 1310 is typically a program such as MICROSOFT'S INTERNET INFORMATION SERVER.

Web server 1310 may host an Active Server Page (ASP) or Internet Server Application Programming Interface (ISAPI) application 1312, which may be executing scripts. The scripts invoke objects that execute business logic (referred to as business objects). The business objects then manipulate data in database 1316 through a database management system (DBMS) 1314. Alternatively, database 1316 may be part of, or connected directly to, client 1302 instead of communicating/obtaining the information from database 1316 across network 1304. When a developer encapsulates the business functionality into objects, the system may be referred to as a component object model (COM) system. Accordingly, the scripts executing on web server 1310 (and/or application 1312) invoke COM objects that implement the business logic. Further, server 1306 may utilize MICROSOFT'S TRANSACTION SERVER (MTS) to access required data stored in database 1316 via an interface such as ADO (Active Data Objects), OLE DB (Object Linking and Embedding DataBase), or ODBC (Open DataBase Connectivity).

Generally, these components 1300-1316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1302 and 1306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1302 and 1306. Embodiments of the invention are implemented as a software/CAD application on a client 1302 or server computer 1306. Further, as described above, the client 1302 or server computer 1306 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention introduce new tools to support stories with game maps through an automated plot facility layout design process. It has been demonstrated that by employing plot facility layout design, existing story and map generation techniques can be utilized, and designers are assisted in their ability to visualize the narrative potential of a story domain. The RL-based approach introduced can rapidly provide solutions and adapt to user intervention, making it suitable for a real-time human-AI co-design workflow. This approach has potential in many game design applications, such as map design, playtime quest generation/adaptation and story debugging; but also potential applications in other domains involving spatial layouts subject to constraints, such as the design of large office buildings or manufacturing plants.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bowen 2019] Bowen Baker, Ingmar Kanitscheider, Todor Markov, YiWu, Glenn Powell, Bob McGrew, and Igor Mordatch. 2019. Emergent tool use from multi-agent autocurricula. arXiv preprint arXiv: 1909.07528 (2019).

[Bellemare 2013] Marc G Bellemare, Yavar Naddaf, Joel Veness, and Michael Bowling. 2013. The arcade learning environment: An evaluation platform for general agents. Journal of Artificial Intelligence Research 47 (2013), 253-279.

[Bergdahl 2020] Joakim Bergdahl, Camilo Gordillo, Konrad Tollmar, and Linus Gisslén. 2020. Augmenting automated game testing with deep reinforcement learning. In 2020 IEEE Conference on Games (CoG). IEEE, 600-603.

[Berner 2019] Christopher Berner, Greg Brockman, Brooke Chan, Vicki Cheung, Przemysław Dębiak, Christy Dennison, David Farhi, Quirin Fischer, Shariq Hashme, Chris Hesse, et al. 2019. Dota 2 with large scale deep reinforcement learning. arXiv preprint arXiv: 1912.06680 (2019).

[Brown 2020] Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. 2020. Language models are few-shot learners. Advances in neural information processing systems 33 (2020), 1877-1901.

[Chen 2023] Hanmo Chen, Stone Tao, Jiaxin Chen, Weihan Shen, Xihui Li, Sikai Cheng, Xiaolong Zhu, and Xiu Li. 2023. Emergent collective intelligence from massive-agent cooperation and competition. arXiv preprint arXiv: 2301.01609 (2023).

[Christiano 2017] Paul F Christiano, Jan Leike, Tom Brown, Miljan Martic, Shane Legg, and Dario Amodei. 2017. Deep reinforcement learning from human preferences. Advances in neural information processing systems 30 (2017).

[Cook 2021] Michael Cook, Jeremy Gow, Gillian Smith, and Simon Colton. 2021. Danesh: Interactive tools for understanding procedural content generators. IEEE Transactions on Games 14, 3 (2021), 329-338.

[A.I. Design 1980] A.I. Design. 1980. Rogue.

[Dieu 2023] Dawid Dieu, Mateusz Markiewicz, Kuba Grodzicki, and SWi98. accessed 2023. Polygonal Map Generation for Games. https://github.com/The Febrin/Polygonal-Map-Generation-for-Games.

[Dormans 2011] Joris Dormans and Sander Bakkes. 2011. Generating missions and spaces for adaptable play experiences. IEEE Transactions on Computational Intelligence and AI in Games 3, 3 (2011), 216-228.

[Game Freak 2022] Game Freak. 2022. Pokémon Legends: Arceus.

[FromSoftware 2022] FromSoftware. 2022. Elden Ring.

[Hartsook 2011] Ken Hartsook, Alexander Zook, Sauvik Das, and Mark O Riedl. 2011. Toward supporting stories with procedurally generated game worlds. In 2011 IEEE Conference on Computational Intelligence and Games (CIG'11). IEEE, 297-304.

[He 2016] Kaiming He, Xiangyu Zhang, Shaoqing Ren, and Jian Sun. 2016. Deep residual learning for image recognition. In Proceedings of the IEEE conference on computer vision and pattern recognition. 770-778.

[Hendrikx 2013] Mark Hendrikx, Sebastiaan Meijer, Joeri Van Der Velden, and Alexandru Iosup. 2013. Procedural content generation for games: A survey. ACM Transactions on Multimedia Computing, Communications, and Applications (TOMM) 9, 1 (2013), 1-22.

[Iskander 2020] Nancy Iskander, Aurelien *Simoni*, Eloi Alonso, and Maxim Peter. 2020. Reinforcement Learning Agents for Ubisoft's Roller Champions. arXiv preprint arXiv: 2012.06031 (2020).

[Jaderberg 2019] Max Jaderberg, Wojciech M Czarnecki, Iain Dunning, Luke Marris, Guy Lever, Antonio Garcia Castaneda, Charles Beattie, Neil C Rabinowitz, Ari S Morcos, Avraham Ruderman, et al. 2019. Human-level performance in 3D multiplayer games with population-based reinforcement learning. Science 364, 6443 (2019), 859-865.

[Kelly 2017] George Kelly and Hugh McCabe. 2017. A Survey of Procedural Techniques for City Generation. The ITB Journal 7, 2 (May 2017). https://doi.org/10.21427/D76M9P.

[Lloyd 1982] Stuart Lloyd. 1982. Least squares quantization in PCM. IEEE transactions on information theory 28, 2 (1982), 129-137.

[Matsumoto 2022] Ryu Matsumoto. 2022. Introduction of Case Studies of Engineer Efforts to Respond to the Open Field of Elden Ring. Computer Entertainment Developers Conference (2022).

[Nintendo 1986] Nintendo. 1986. The Legend of Zelda.

[Nintendo 2017] Nintendo. 2017. The Legend of Zelda: Breath of the Wild.

[Patel 2010] Amit Patel. 2010. Polygonal map generation for games. Red Blob Games 4 (2010).

[Portelas 2021] Rémy Portelas, Cédric Colas, Lilian Weng, Katja Hofmann, and Pierre-yves Oudeyer. 2021. Automatic Curriculum Learning For Deep RL: A Short Survey. In IJCAI 2020-International Joint Conference on Artificial Intelligence.

[Radford 2021] Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. Learning transferable visual models from natural language supervision. In International conference on machine learning. PMLR, 8748-8763.

[Reimers 2019] Nils Reimers and Iryna Gurevych. 2019. Sentence-bert: Sentence embeddings using siamese bert-networks. arXiv preprint arXiv: 1908.10084 (2019).

[Risi 2020] Sebastian Risi and Julian Togelius. 2020. Increasing generality in machine learning through procedural content generation. Nature Machine Intelligence 2, 8 (2020), 428-436.

[Schulman 2017] John Schulman, Filip Wolski, Prafulla Dhariwal, Alec Radford, and Oleg Klimov. 2017. Proximal policy optimization algorithms. arXiv preprint arXiv: 1707.06347 (2017).

[Smelik 2009] Ruben Smelik, Klaas Jan de Kraker, Saskia Groenewegen, Tim Tutenel, and Rafael Bidarra. 2009. A Survey of Procedural Methods for Terrain Modelling.

[Smith 2010] Gillian Smith, Jim Whitehead, and Michael Mateas. 2010. Tanagra: A mixed-initiative level design tool. In Proceedings of the Fifth International Conference on the Foundations of Digital Games. 209-216.

[Open Ended Learning Team 2021] Open Ended Learning Team, Adam Stooke, Anuj Mahajan, Catarina Barros, Charlie Deck, Jakob Bauer, Jakub Sygnowski, Maja Trebacz, Max Jaderberg, Michael Mathieu, et al. 2021. Open-ended learning leads to generally capable agents. arXiv preprint arXiv: 2107.12808 (2021).

[Togelius 2011] Julian Togelius, Georgios N Yannakakis, Kenneth O Stanley, and Cameron Browne. 2011. Search-based procedural content generation: A taxonomy and survey. IEEE Transactions on Computational Intelligence and AI in Games 3, 3 (2011), 172-186.

[Valls-Vargas 2013] Josep Valls-Vargas, Santiago Ontanón, and Jichen Zhu. 2013. Towards story-based content generation: From plot-points to maps. In 2013 IEEE Conference on Computational Inteligence in Games (CIG). IEEE, 1-8.

[van der Linden 2014] Roland van der Linden, Ricardo Lopes, and Rafael Bidarra. 2014. Procedural Generation of Dungeons. IEEE Transactions on Computational Intelligence and AI in Games 6, 1 (2014), 78-89. https://doi.org/10.1109/TCLAIG.2013.2290371

[Vinyals 2019] Oriol Vinyals, Igor Babuschkin, Wojciech M Czarnecki, Michaël Mathieu, Andrew Dudzik, Junyoung Chung, David H Choi, Richard Powell, Timo Ewalds, Petko Georgiev, et al. 2019. Grandmaster level in StarCraft II using multi-agent reinforcement learning. Nature 575, 7782 (2019), 350-354.

[Yannakakis 2014] Georgios N. Yannakakis, Antonios Liapis, and Constantine Alexopoulos. 2014. Mixedinitiative co-creativity. In International Conference on Foundations of Digital Games.

[Zhang 2018] Chiyuan Zhang, Oriol Vinyals, Remi Munos, and Samy Bengio. 2018. A study on overfitting in deep reinforcement learning. arXiv preprint arXiv: 1804.06893 (2018).

What is claimed is:

1. A computer-implemented method for building a game world, comprising:
- (a) obtaining a story comprising a textual narrative of a sequence of events;
- (b) extracting two or more plot facilities and a set of constraints from the story, wherein:
  - (i) each of the two or more plot facilities comprises a conceptual location where an event happens in the story;
  - (ii) each constraint in the set of constraints defines a spatial relation between two or more of the plot facilities; and
- (c) generating a map based on the set of constraints, wherein the generating comprises:
  - (i) generating a terrain, wherein the terrain comprises two dimensional (2D) polygons and each 2D polygon is associated with a biome type; and
  - (ii) assigning each of the two or more plot facilities to one or more points on the terrain, wherein the assigning complies with a maximum number of constraints in the set of constraints, and wherein the assigning utilizes reinforcement learning (RL) to optimize positions of the points.

2. The computer-implemented method of claim 1, wherein:
- (a) the two or more plot facilities are extracted from the story using a plot reasoner;
- (b) the plot reasoner extracts the two or more plot facilities based on integrated information in a knowledge base;
- (c) the knowledge base comprises:
  - (i) a story domain that comprises the events and domain constraints;
  - (ii) a map component ontology comprising map units, geographical constraints, and functional constraints; and
  - (iii) game design common sense knowledge.

3. The computer-implemented method of claim 1, wherein:
- the two or more plot facilities and the set of constraints are each associated with a natural language utterance in the textual narrative;
- the two or more plot facilities and the set of constraints are extracted from the story using a large language model.

4. The computer-implemented method of claim 1, wherein:

the assigning of each of the two or more plot facilities on the map to the one or more points is performed using a gradient descent method.

5. The computer-implemented method of claim 1, wherein the reinforcement learning (RL) comprises:

training an RL Model; and utilizing the RL model to sequentially move each of the two or more plot facilities on the map to optimize the positions of the points.

6. The computer-implemented method of claim 5, wherein the training the RL model comprises:

generating a dataset of multiple facility layout tasks, wherein:

each task arranges a layout of a defined number of plot facilities on top of the map based on a subset of constraints from the set of constraints;

the map comprises a minimum number of the biome types;

the map is procedurally generated; and each of the constraints in the subset of constraints is based on a constraint type from a set of constraint types.

7. The computer-implemented method of claim 6, wherein the map is procedurally generated by:

generating a grid of the 2D polygons from random points, wherein the 2D polygons comprise Voronoi polygons;

performing Lloyd relaxation to ensure even distribution of polygon centroids;

generating a coastline using a flooding simulation, wherein during the generating, tiles within the terrain are assigned a terrain type of ocean, coast, lake, or land;

determining an elevation for each of the tiles by a distance from the coastline with the elevation normalized to a defined height distribution;

creating a river along a downhill path from a randomly selected mountain corner to a nearest terrain type of lake or ocean;

assigning a moisture level to each tile according to a distance from a freshwater source;

assigning the biome type to each of the 2D polygons based on a combination of the moisture level and elevation.

8. The computer-implemented method of claim 6, wherein each constraint is generated by:

associating a set of random new constraints to a randomly sampled map, wherein:

the random new constraints are randomly selected from a set of predefined constraint types;

each predefined constraint type comprises a biome placeholder and a plot facility placeholder;

the predefined constraint types in the set of predefined constraint types are instantiated to become the random new constraints by substituting each biome placeholder with the biome type and substituting each plot facility placeholders with a plot facility identification;

for each constraint type, a heuristic function checks if each random new constraint is satisfied by the randomly sampled map; and the randomly sampled map is provided as the map representing the story.

9. The computer-implemented method of claim 1, further comprising:

receiving input moving one of the two or more plot facilities;

autonomously updating the map and the positions of the points based on the input, wherein the autonomously updating occurs in real time dynamically as the input is received.

10. The computer-implemented method of claim 1, further comprising:

utilizing the map as a debugging tool to:

evaluate an interaction between the story and spacing between the two or more plot facilities; and modify the story or move one or more of the two or more plot facilities based on the evaluation.

11. A computer-implemented system for building a game world, comprising:

(a) a computer having a memory;

(b) a processor executing on the computer;

(c) the memory storing a set of instructions, wherein the set of instructions, when executed by the processor cause the processor to perform operations comprising:

(i) obtaining a story comprising a textual narrative of a sequence of events;

(ii) extracting two or more plot facilities and a set of constraints from the story, wherein:

(1) each of the two or more plot facilities comprises a conceptual location where an event happens in the story;

(2) each constraint in the set of constraints defines a spatial relation between two or more of the plot facilities; and (iii) generating a map based on the set of constraints, wherein the generating comprises:

(1) generating a terrain, wherein the terrain comprises two dimensional (2D) polygons and each 2D polygon is associated with a biome type; and (2) assigning each of the two or more plot facilities to one or more points on the terrain, wherein the assigning complies with a maximum number of constraints in the set of constraints, and wherein the assigning utilizes reinforcement learning (RL) to optimize positions of the points.

12. The computer-implemented system of claim 11, wherein:

(a) the two or more plot facilities are extracted from the story using a plot reasoner;

(b) the plot reasoner extracts the two or more plot facilities based on integrated information in a knowledge base;

(c) the knowledge base comprises:

(i) a story domain that comprises the events and domain constraints;

(ii) a map component ontology comprising map units, geographical constraints, and functional constraints; and (iii) game design common sense knowledge.

13. The computer-implemented system of claim 11, wherein:

the two or more plot facilities and the set of constraints are each associated with a natural language utterance in the textual narrative;

the two or more plot facilities and the set of constraints are extracted from the story using a large language model.

14. The computer-implemented system of claim 11, wherein:

the assigning of each of the two or more plot facilities on the map to the one or more points is performed using a gradient descent method.

15. The computer-implemented system of claim 11, wherein the reinforcement learning (RL) comprises:

training an RL Model; and utilizing the RL model to sequentially move each of the two or more plot facilities on the map to optimize the positions of the points.

16. The computer-implemented system of claim 15, wherein the training the RL model comprises:

generating a dataset of multiple facility layout tasks, wherein:

each task arranges a layout of a defined number of plot facilities on top of the map based on a subset of constraints from the set of constraints;

the map comprises a minimum number of the biome types;

the map is procedurally generated; and each of the constraints in the subset of constraints is based on a constraint type from a set of constraint types.

17. The computer-implemented system of claim 16, wherein the map is procedurally generated by:

generating a grid of the 2D polygons from random points, wherein the 2D polygons comprise Voronoi polygons;

performing Lloyd relaxation to ensure even distribution of polygon centroids;

generating a coastline using a flooding simulation, wherein during the generating, tiles within the terrain are assigned a terrain type of ocean, coast, lake, or land;

determining an elevation for each of the tiles by a distance from the coastline with the elevation normalized to a defined height distribution;

creating a river along a downhill path from a randomly selected mountain corner to a nearest terrain type of lake or ocean;

assigning a moisture level to each tile according to a distance from a freshwater source;

assigning the biome type to each of the 2D polygons based on a combination of the moisture level and elevation.

18. The computer-implemented system of claim 16, wherein each constraint is generated by:

associating a set of random new constraints to a randomly sampled map, wherein:

the random new constraints are randomly selected from a set of predefined constraint types;

each predefined constraint type comprises a biome placeholder and a plot facility placeholder;

the predefined constraint types in the set of predefined constraint types are instantiated to become the random new constraints by substituting each biome placeholder with the biome type and substituting each plot facility placeholders with a plot facility identification;

for each constraint type, a heuristic function checks if each random new constraint is satisfied by the randomly sampled map; and the randomly sampled map is provided as the map representing the story.

19. The computer-implemented system of claim 11, wherein the operations further comprise:

receiving input moving one of the two or more plot facilities;

autonomously updating the map and the positions of the points based on the input, wherein the autonomously updating occurs in real time dynamically as the input is received.

20. The computer-implemented system of claim 11, wherein the operations further comprise:

utilizing the map as a debugging tool to:

evaluate an interaction between the story and spacing between the two or more plot facilities; and modify the story or move one or more of the two or more plot facilities based on the evaluation.

* * * * *